(12) United States Patent
Inagaki

(10) Patent No.: US 9,013,522 B2
(45) Date of Patent: Apr. 21, 2015

(54) DISPLAY APPARATUS AND METHOD OF CONTROLLING THE SAME

(71) Applicant: Canon Kabushiki Kaisha, Tokyo (JP)

(72) Inventor: Kensuke Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/956,306

(22) Filed: Jul. 31, 2013

(65) Prior Publication Data

US 2014/0035966 A1    Feb. 6, 2014

(30) Foreign Application Priority Data

Aug. 6, 2012  (JP) ................................. 2012-174362

(51) Int. Cl.
*G09G 5/10*         (2006.01)
*H04N 9/31*         (2006.01)
*G09G 3/36*         (2006.01)

(52) U.S. Cl.
CPC ............... *G09G 5/10* (2013.01); *H04N 9/3182* (2013.01); *G09G 3/3611* (2013.01); *G09G 2320/0209* (2013.01)

(58) Field of Classification Search
USPC .......................... 345/204, 690–693; 382/167
See application file for complete search history.

(56) References Cited

U.S. PATENT DOCUMENTS 8,786,894 B2 *   7/2014  Kondo .......................... 358/1.2
2005/0030302 A1 *  2/2005  Nishi et al. ..................... 345/204
2008/0253650 A1 * 10/2008  Kuniba ......................... 382/167

FOREIGN PATENT DOCUMENTS

JP         2009-104053 A     5/2009

* cited by examiner

*Primary Examiner* — Ricardo L Osorio
(74) *Attorney, Agent, or Firm* — Carter, DeLuca, Farrell & Schmidt, LLP

(57) ABSTRACT

For each predetermined block of a display image, a correction value is calculated based on an image in the block, and the image of the predetermined block is corrected based on the correction value of the predetermined block and the correction values of blocks around the predetermined block.

19 Claims, 18 Drawing Sheets

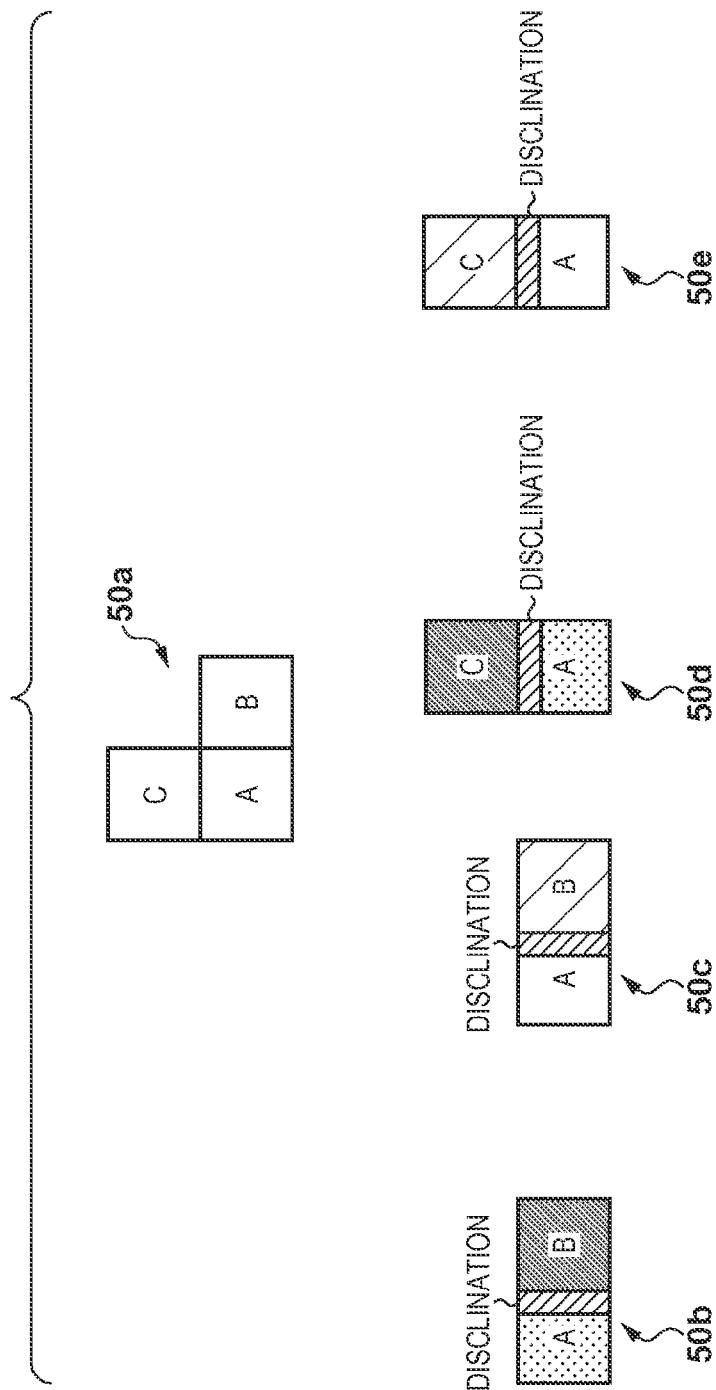

| LEVEL OF ADJACENT PIXEL B | LEVEL OF REFERENCE PIXEL A | | | |
|---|---|---|---|---|
| | $AL0 \leq A \leq AL1$ | $AL1 < A \leq AL2$ | $AL2 < A \leq AL3$ | $AL3 < A \leq AL4$ |
| $BL0 \leq B \leq BL1$ | ABL00 | ABL01 | ABL02 | ABL03 |

51b

| LEVEL OF ADJACENT PIXEL B | LEVEL OF REFERENCE PIXEL A | | |
|---|---|---|---|
| | $AH0 \leq A \leq AH1$ | $AH1 < A \leq AH2$ | $AH2 < A \leq AH3$ |
| $BH0 \leq B \leq BH1$ | ABH00 | ABH01 | ABH02 |
| $BH1 < B \leq BH2$ | ABH10 | ABH11 | ABH12 |

51c

| LEVEL OF ADJACENT PIXEL C | LEVEL OF REFERENCE PIXEL A | | | |
|---|---|---|---|---|
| | $AL0 \leq A \leq AL1$ | $AL1 < A \leq AL2$ | $AL2 < A \leq AL3$ | $AL3 < A \leq AL4$ |
| $CL0 \leq C \leq CL1$ | ACL00 | ACL01 | ACL02 | ACL03 |

51d

| LEVEL OF ADJACENT PIXEL C | LEVEL OF REFERENCE PIXEL A | | |
|---|---|---|---|
| | $AH0 \leq A \leq AH1$ | $AH1 < A \leq AH2$ | $AH2 < A \leq AH3$ |
| $CH0 \leq C \leq CH1$ | ACH00 | ACH01 | ACH02 |
| $CH1 < C \leq CH2$ | ACH10 | ACH11 | ACH12 |

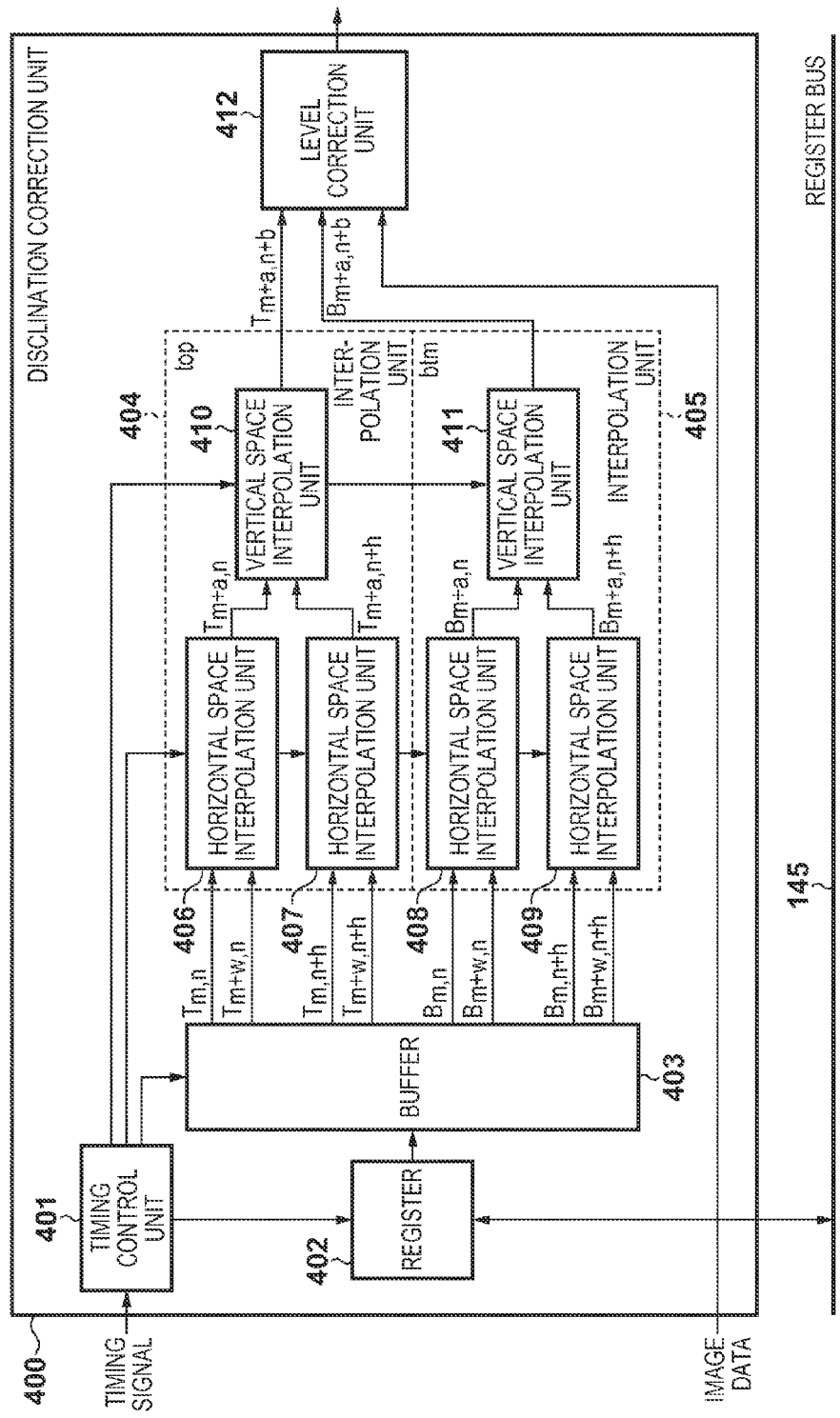

F I G. 12A

| | AL0 ≤ A ≤ AL1 | AL1 < A ≤ AL2 | AL2 < A ≤ AL3 | AL3 < A ≤ AL4 |
|---|---|---|---|---|
| BL0 ≤ B ≤ BL1 | TL00 | TL01 | TL02 | TL03 |

F I G. 12B

| | AL0 ≤ A ≤ AL1 | AL1 < A ≤ AL2 | AL2 < A ≤ AL3 | AL3 < A ≤ AL4 |
|---|---|---|---|---|
| BL0 ≤ B ≤ BL1 | ML00 | ML01 | ML02 | ML03 |

F I G. 12C

| | AH0 < A ≤ AH1 | AH1 < A ≤ AH2 | AH2 < A ≤ AH3 |
|---|---|---|---|
| CH0 ≤ C ≤ CH1 | TH00 | TH01 | TH02 |
| CH1 < C ≤ CH2 | TH10 | TH11 | TH12 |

F I G. 12D

| | AH0 < A ≤ AH1 | AH1 < A ≤ AH2 | AH2 < A ≤ AH3 |
|---|---|---|---|
| CH0 ≤ C ≤ CH1 | MH00 | MH01 | MH02 |
| CH1 < C ≤ CH2 | MH10 | MH11 | MH12 |

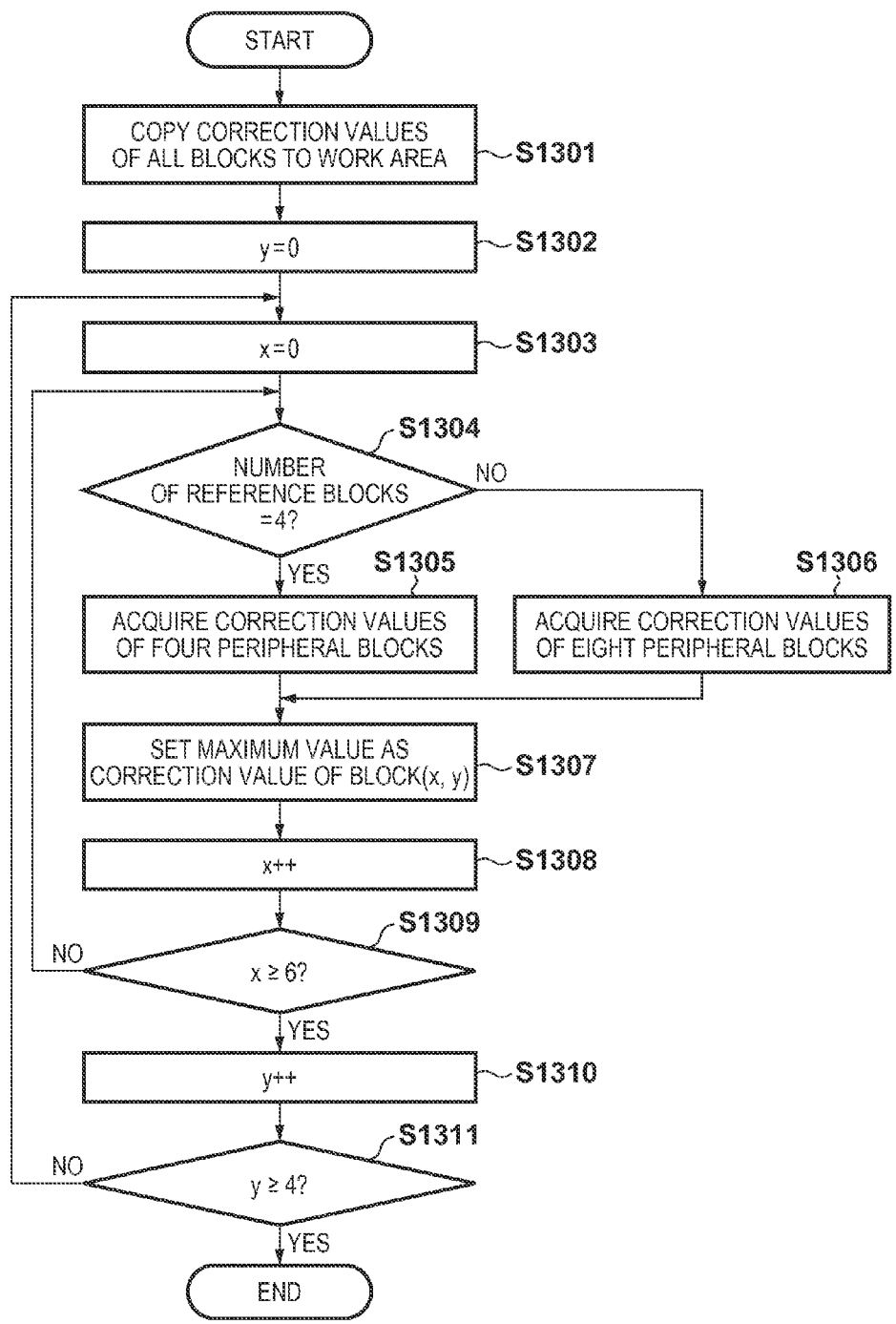

F I G. 17A
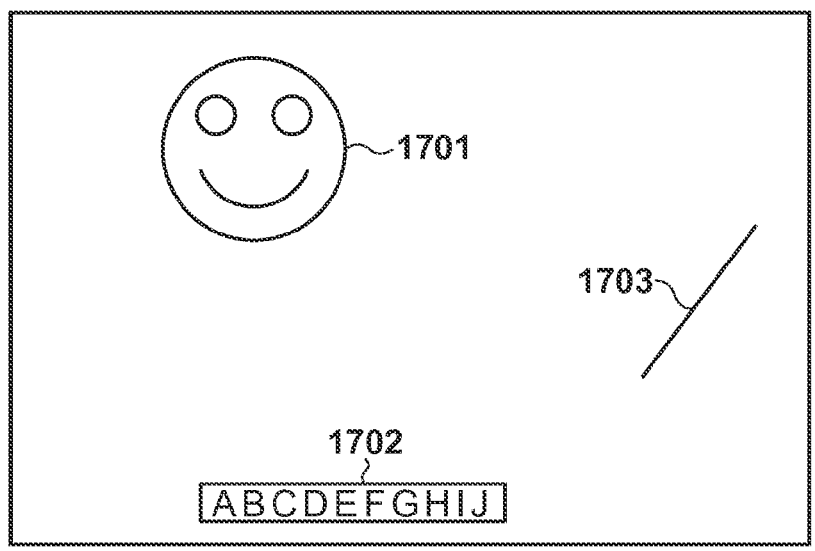
F I G. 17B
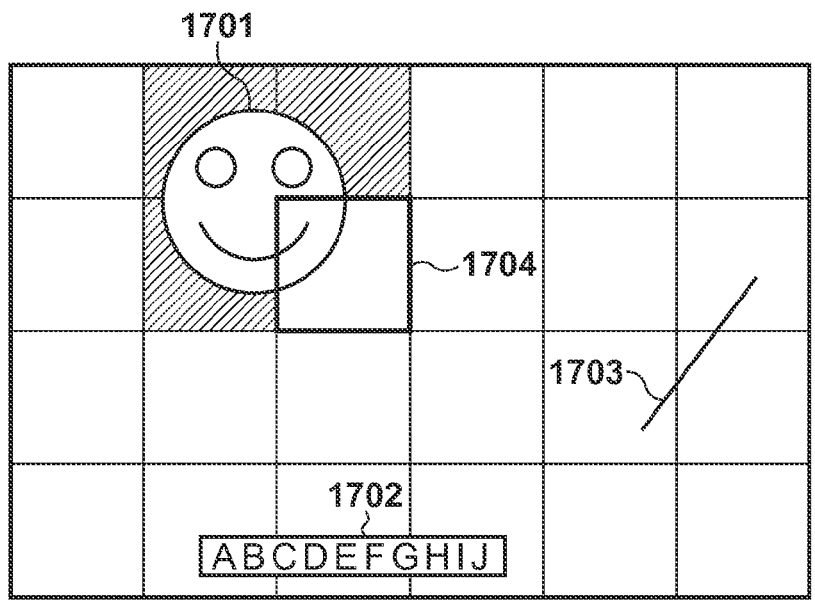

DISPLAY APPARATUS AND METHOD OF CONTROLLING THE SAME

BACKGROUND OF THE INVENTION

1. Field of the Invention

The present invention relates to a display apparatus and a method of controlling the same.

2. Description of the Related Art

As liquid crystal display apparatuses, liquid crystal projectors have conventionally been known, which supply light from a light source to a liquid crystal panel and project the light that has passed through the liquid crystal panel to a projection plane, thereby displaying an image. These projectors generally control the voltage to be applied to each pixel of the liquid crystal panel for forming an image by matrix driving so as to change the alignment direction of the liquid crystal and adjust the light transmittance.

The physical size of a pixel will be smaller along with an increase in the number of pixels of a liquid crystal panel in the future. Then, for example, when displaying an image whose luminance largely changes between adjacent pixels, that is, if the voltages applied to the adjacent pixels have a large difference, the liquid crystal alignment direction is distorted due to the influence of the voltages of the horizontal pixels. This distortion eventually affects the transmittance of the liquid crystal and lowers the quality of a displayed image. For example, if a high-luminance pixel and a low-luminance pixel are adjacent to each other, display unevenness occurs so that one of the pixels partially darkens or brightens.

To solve this problem, Japanese patent literature 1 (Japanese Patent Laid-Open No. 2009-104053) discloses a technique of calculating the tone difference between two pixels adjacent to each other out of a plurality of pixels and correcting an image signal so as to make the calculated difference small.

In patent literature 1, however, the tones of the adjacent pixels in the image signal are compared and corrected. Since the balance in the entire image or the like is not taken into consideration, the image quality may lower anew in the corrected image signal.

SUMMARY OF THE INVENTION

One embodiment of the present invention provides a display apparatus that reduces any new degradation in image quality in an image signal after correction of the image signal.

According to one aspect of the present invention, there is provided an image display apparatus comprising: a calculation unit configured to calculate a correction value for each predetermined block of a display image based on an image in the block; and a correction unit configured to correct the image of the predetermined block based on the correction value of the predetermined block and correction values of blocks around the predetermined block.

According to another aspect of the present invention, there is provided a control method to control an image display apparatus, the method comprising: a calculation step of calculating a correction value for each predetermined block of a display image based on an image in the block; and a correction step of correcting the image of the predetermined block based on the correction value of the predetermined block and correction values of blocks around the predetermined block.

Further features of the present invention will become apparent from the following description of exemplary embodiments with reference to the attached drawings.

BRIEF DESCRIPTION OF THE DRAWINGS

FIG. 5A is a view for explaining a disclination detection operation;

FIG. 5B is a view for explaining a disclination detection operation;

FIG. 7 is a block diagram showing an example of the arrangement of a disclination correction unit;

FIGS. 12A to 12D are views showing an example of a threshold table and a correction value table;

FIG. 13A is a flowchart showing correction value expansion processing;

FIGS. 17A and 17B are views for explaining a specific pattern and correction value expansion processing according to the third embodiment.

DESCRIPTION OF THE EMBODIMENTS

The embodiments of the present invention will now be described in detail with reference to the accompanying drawings. Note that the following embodiments do not limit the present invention determined by the scope of claims, and not all the combinations of features described in the embodiments are essential to the solving means of the present invention.

Note that in the following embodiments, a projector will be exemplified. However, the present invention is applicable not only to a projector but also to any liquid crystal display apparatus capable of displaying an image using a liquid crystal panel.

Note that functional blocks to be described in the embodiments need not always be separate pieces of hardware. For example, the functions of several functional blocks may be executed by one piece of hardware or by a cooperative operation of several pieces of hardware. In the embodiments, the phenomenon in which the liquid crystal alignment direction is distorted due to the influence of the voltages of horizontal pixels when displaying an image whose luminance largely changes between adjacent pixels, that is, if the voltages applied to the adjacent pixels have a large difference will be referred to as a disclination.

[First Embodiment]

A projector according to this embodiment displays an image by changing the transmittance on the liquid crystal panel based on the input image and projecting light of a light source, which has passed through the liquid crystal panel, to the projection plane (screen). The projector of this embodiment divides the input image into blocks, analyzes the image, and decides the correction value of a block predicted to cause a disclination. The projector also compares the correction values of peripheral blocks and decides the correction value of each block.

<Overall Arrangement of Liquid Crystal Projector>

Figure 1:
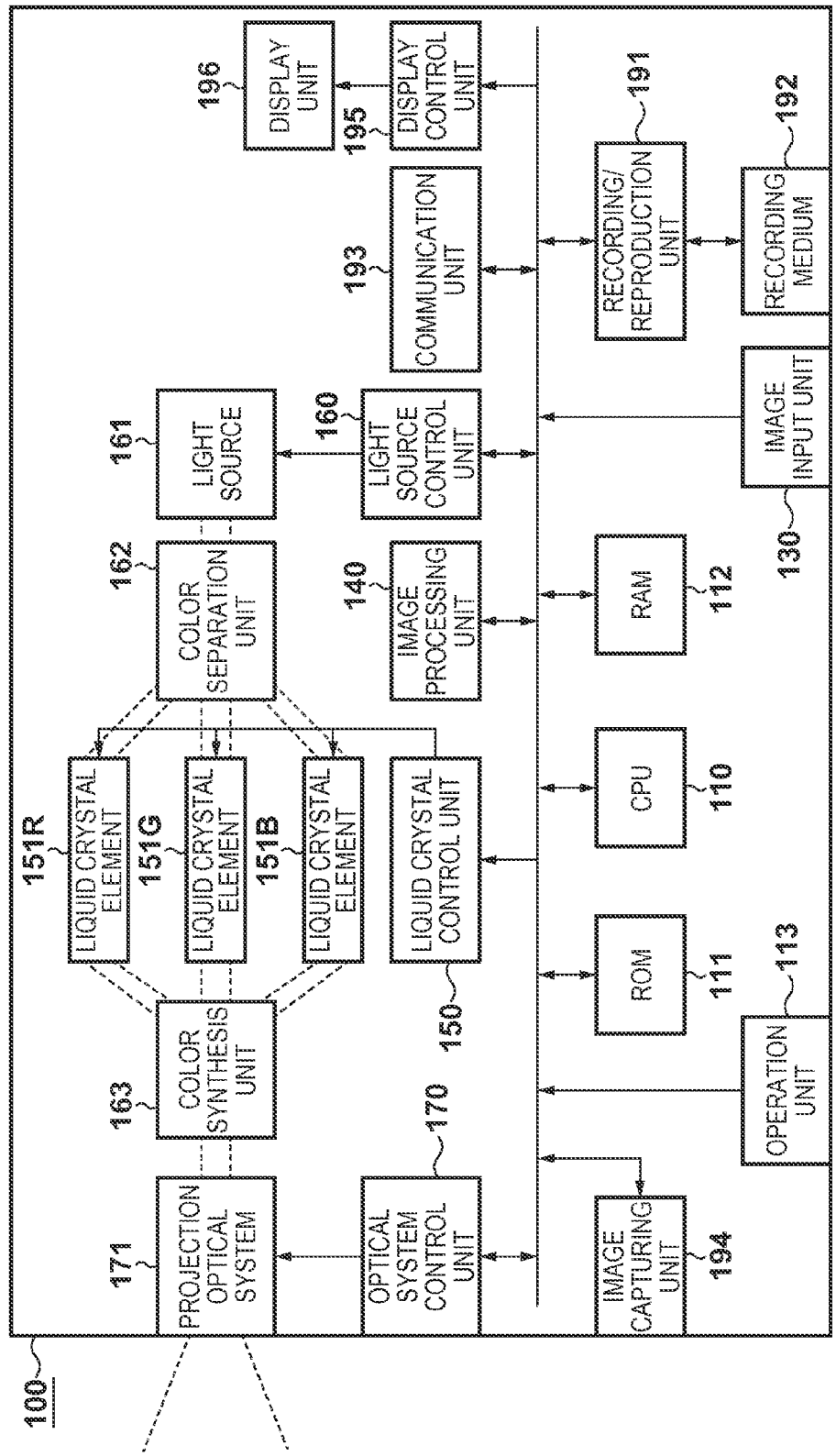
FIG. 1 is a block diagram showing the overall arrangement of a liquid crystal projector according to an embodiment.

The overall arrangement of a liquid crystal projector according to this embodiment will be described first with reference to FIG. 1. FIG. 1 is a block diagram showing the overall arrangement of a liquid crystal projector 100 according to this embodiment. As shown in FIG. 1, the liquid crystal projector 100 includes a CPU 110, a ROM 111, a RAM 112, an operation unit 113, an image input unit 130, and an image processing unit 140. The liquid crystal projector 100 also includes a liquid crystal control unit 150, liquid crystal panels 151R, 151G, and 151B, a light source control unit 160, a light source 161, a color separation unit 162, a color synthesis unit 163, an optical system control unit 170, and a projection optical system 171. The liquid crystal projector 100 also includes a recording/reproduction unit 191, a recording medium 192, a communication unit 193, an image capturing unit 194, a display control unit 195, and a display unit 196.

The CPU 110 executes control programs stored the ROM 111, thereby controlling each operation of the liquid crystal projector 100. The ROM 111 stores control programs that describe the processing procedures of the CPU 110, various kinds of constants, and the like. The RAM 112 serves as a work memory and temporarily stores the control programs and data. The CPU 110 can also execute a program stored in the ROM 111 to temporarily store, in the RAM 112, still image data or moving image data reproduced from the recording medium 192 by the recording/reproduction unit 191 and reproduce the image or video. The CPU 110 can also execute a program stored in the ROM 111 to temporarily store, in the RAM 112, still image data or moving image data received by the communication unit 193 and reproduce the image or video. The CPU 110 can also execute a program stored in the ROM 111 to temporarily store an image or video obtained by the image capturing unit 194 in the RAM 112, convert the image or video into still image data or moving image data, and record the data in the recording medium 192.

The operation unit 113 accepts a user instruction and transmits an instruction signal to the CPU 110, and includes, for example, a switch, a dial, and a touch panel provided on the display unit 196. The operation unit 113 may include, for example, a signal reception unit (for example, infrared reception unit) that receives a signal from a remote controller and transmit a predetermined instruction signal to the CPU 110 based on the received signal. The CPU 110 receives a control signal input from the operation unit 113 or the communication unit 193 and controls each operation of the liquid crystal projector 100.

The image input unit 130 receives a video signal from an external apparatus, and includes, for example, a composite terminal, an S video terminal, a D terminal, a component terminal, analog R, C, and B terminals, a DVI-I terminal, a DVI-D terminal, and an HDMI® terminal. The image input unit 130 transmits a received video signal to the image processing unit 140. Upon receiving an analog video signal, the image input unit 130 converts the received analog video signal into a digital video signal. The external apparatus can be a personal computer, a camera, a portable phone, a smartphone, a hard disk recorder, a game machine, or any other apparatus capable of outputting a video signal.

The image processing unit 140 performs change processing for changing the number of frames, the number of pixels, the image shape, or the like, detection of a pattern in which a disclination occurs, disclination correction processing, or the like for a video signal received from the image input unit 130, and transmits the video signal to the liquid crystal control unit 150. The image processing unit 140 typically includes a microprocessor for image processing. However, the image processing unit 140 need not always be such a dedicated microprocessor. For example, the CPU 110 may implement the function of the image processing unit 140 using a program stored in the ROM 111. The image processing unit 140 can also execute frame thinning processing, frame interpolation processing, resolution conversion processing, and distortion correction processing (keystone correction processing). The image processing unit 110 can perform the above-described change processing not only for the video signal received from the image input unit 130 but also for an image or video reproduced by the CPU 110.

The liquid crystal control unit 150 controls voltages to be applied no the liquid crystals of the pixels of the liquid crystal panels 151R, 151G, and 151B based on the video signal processed by the image processing unit 140, thereby adjusting the transmittances of the liquid crystal panels 151R, 151G, and 151B. The liquid crystal control unit 150 typically includes a microprocessor for liquid crystal control. However, the liquid crystal control unit 150 need not always be such a dedicated microprocessor. For example, the CPU 110 that executes a program stored in the ROM 111 may execute the same processing as that of the liquid crystal control unit 150.

For example, when inputting a video signal to the image processing unit 140, every time one frame image is received from the image processing unit 140, the liquid crystal control unit 150 controls the liquid crystal panels 151R, 151G, and 151B to make them have transmittances corresponding to the image. The liquid crystal panel 151R is a liquid crystal element corresponding to red, and adjusts the transmittance of red light out of light output from the light source 161 and separated into red (R), green (C), and blue (B) light components by the color separation unit 162. The liquid crystal panel 151G is a liquid crystal element corresponding to green, and adjusts the transmittance of green light out of light output from the light source 161 and separated by the color separation unit 162. The liquid crystal panel 151B is a liquid crystal element corresponding to blue, and adjusts the transmittance of blue light out of light output from the light source 161 and separated into red (R), green (G), and blue (B) light components by the color separation unit 162. Note that the detailed control operation of the liquid crystal panels 151R, 151G, and 151B by the liquid crystal control unit 150 and the arrangements of the liquid crystal panels 151R, 151G, and 151B will be described later.

The light source control unit 160 controls on/off of the light source 161 and its light amount, and includes a microprocessor for light amount control. Note that the light source control unit 160 need not always be such a dedicated microprocessor. For example, the CPU 110 that executes a program stored in the ROM 111 may execute the same processing as that of the light source control unit 160. The light source 161 outputs light to project an image on a screen (not shown), and can be, for example, a halogen lamp, a xenon lamp, or a high-pressure mercury lamp. The color separation unit 162 separates light output from the light source 161 into red (R), green (G), and blue (B) light components, and includes, for example, a dichroic mirror or a prism. Note that the color separation unit 162 is unnecessary when LEDs corresponding to the respective colors are used as the light source 161.

The color synthesis unit 163 synthesizes the red (R), green (G), and blue (B) light components that have passed through the liquid crystal panels 151R, 151G, and 151B and includes, for example, a dichroic mirror or a prism. The light synthesized by the color synthesis unit 163 is sent to the projection optical system 171. At this time, the liquid crystal panels 151R, 151G, and 151B are controlled by the liquid crystal control unit 150 to have transmittances corresponding to the image input from the image processing unit 140. For this reason, when the light synthesized by the color synthesis unit 163 is projected on the screen by the projection optical system 171, an image corresponding to the image input from the image processing unit 140 is displayed on the screen.

The optical system control unit 170 controls the projection optical system 171, and includes a microprocessor for projection optical system control. However, the optical system control unit 170 need not always be a dedicated microprocessor. For example, the CPU 110 that executes a program stored in the ROM 111 may execute the same processing as that of the optical system control unit 170. The projection optical system 171 projects the synthesized light output from the color synthesis unit 163 on the screen, and includes a plurality of lenses and an actuator for driving the lenses. The optical system control unit 170 drives the lenses by the actuator, thereby performing enlargement, reduction, and focus adjustment of the projected image.

The recording/reproduction unit 191 reproduces still image data or moving image data from the recording medium 192, or records, in the recording medium 192, still image data or moving image data obtained by the image capturing unit 194. The recording/reproduction unit 191 may record, in the recording medium 192, still image data or moving image data received by the communication unit 193. The recording/reproduction unit 191 typically includes an interface electrically connected to the recording medium 192 or a dedicated microprocessor for communication with the recording medium 192. However, the recording/reproduction unit 191 need not always be a dedicated microprocessor. For example, the CPU 110 that executes a program stored in the ROM 111 may execute the same processing as that of the recording/reproduction unit 191. The recording medium 192 can record still image data, moving image data, and control data necessary for the liquid crystal projector of this embodiment. As the recording medium 192, a recording medium of any system such as a magnetic disk, an optical disk, or a semiconductor memory is usable. The recording medium can be detachable or incorporated.

The communication unit 193 receives a control signal, still image data, or moving image data from an external apparatus, and can be, for example, wireless LAN, wired LAN, USB, or Bluetooth®. The communication system is not particularly limited. If the terminal of the image input unit 130 is, for example, an HDMI® terminal, CEC communication may be performed via the terminal. The external apparatus can be a personal computer, a camera, a portable phone, a smartphone, a hard disk recorder, a game machine, a remote controller, or any other apparatus capable of communicating with the liquid crystal projector 100.

The image capturing unit 194 captures the periphery of the liquid crystal projector 100 according to this embodiment and acquires an image signal. The image capturing unit 194 can capture (capture in the screen direction) an image projected via the projection optical system 171. The CPU 110 that executes a program stored in the ROM 111 temporarily stores an image or video obtained by the image capturing unit 194 in the RAM 112, and converts the image or video into still image data or moving image data. The image capturing unit 194 includes a lens that captures an optical image of an object, an image sensor that converts the optical image acquired via the lens into an image signal, and an A/D conversion unit that converts the image signal obtained by the image sensor into a digital signal. The image capturing unit 194 also includes an actuator that drives the lens, and a microprocessor that controls the actuator. Note that the image capturing unit 194 need not always capture in the screen direction and may capture, for example, the viewer side in the direction opposite to the screen.

The display control unit 195 displays an operation screen or an image of a switch icon used to operate the liquid crystal projector 100 on the display unit 196 provided on the liquid crystal projector 100. The display control unit 195 includes a dedicated microprocessor for display control. However, the display control unit 195 need not always be a dedicated microprocessor. For example, the CPU 110 may execute the same processing as that of the display control unit 195 using a program stored in the ROM 111. The display unit 196 displays an operation screen or a switch icon used to operate the liquid crystal projector 100. The display unit 196 can be, for example, a liquid crystal display, a CRT display, an organic EL display, an LED display, or any other display capable of displaying an image. To recognizably present a specific button to the user, an LED or the like corresponding to each button may be caused to emit light.

Note that the image processing unit 140, the liquid crystal control unit 150, the light source control unit 160, the optical system control unit 170, the recording/reproduction unit 191, and the display control unit 195 of this embodiment can be formed from a single or a plurality of microprocessors capable of performing the same processes as those of the blocks. Alternatively, the CPU 110 may execute the same processes as those of the blocks using programs stored in the ROM 111.

<Basic Operation>

Figure 2:
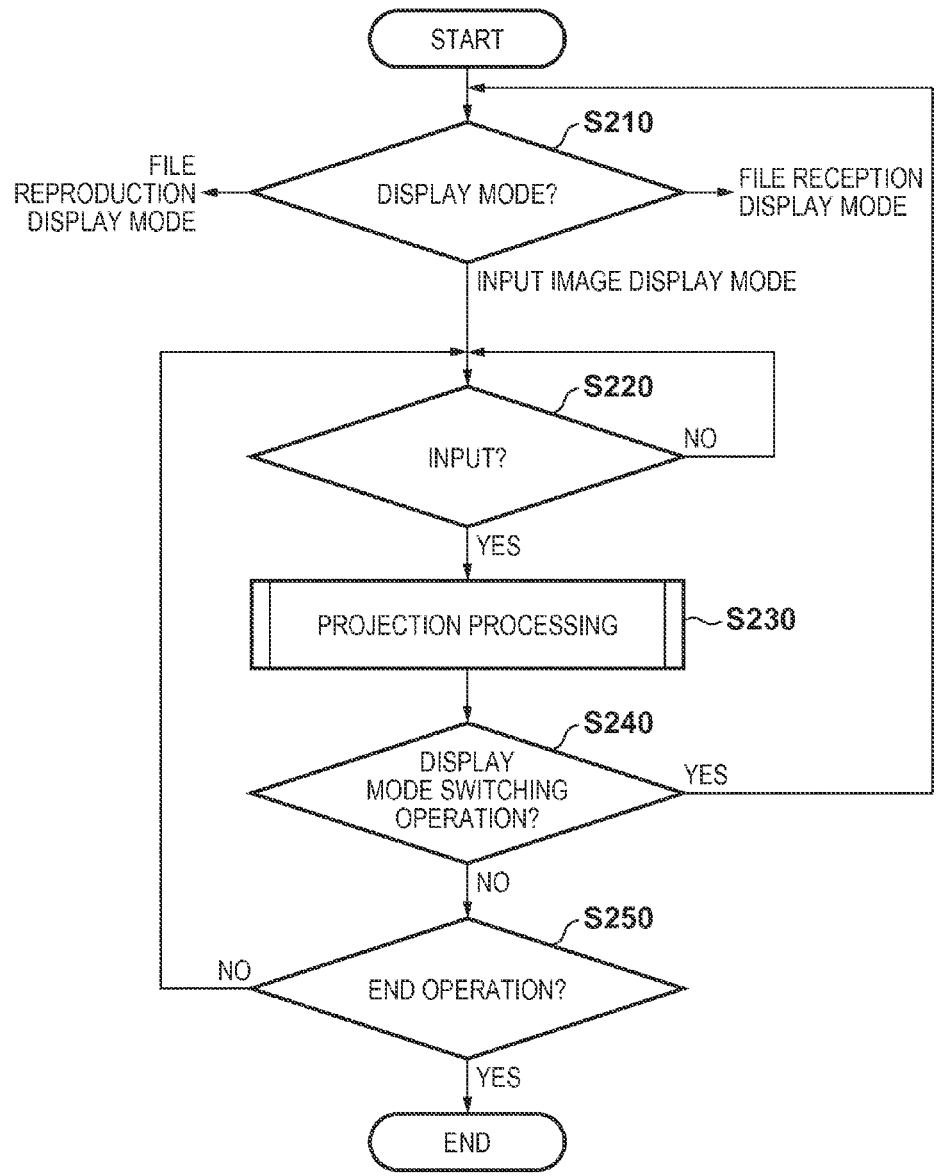
FIG. 2 is a flowchart showing the basic operation of the liquid crystal projector according to the embodiment.

The basic operation of the liquid crystal projector 100 according to this embodiment will be described next with reference to FIGS. 1 and 2. FIG. 2 is a flowchart for explaining the basic operation of the liquid crystal projector 100 according to this embodiment. The operation shown in FIG. 2 is basically implemented by causing the CPU 110 to execute the programs stored in the ROM 111 and control the functional blocks. The flowchart of FIG. 2 starts from a point of time at which the user instructs to power on the liquid crystal projector 100 using the operation unit 113 or a remote controller (not shown). That is, when the user instructs to power on the liquid crystal projector 100 using the operation unit 113 or a remote controller (not shown), the CPU 110 causes a power supply unit (not shown) to supply power to the respective units of the liquid crystal projector 100, and starts processing shown in FIG. 2.

In step S210, the CPU 110 determines the display mode selected by the user operation on the operation unit 113 or the remote controller. The liquid, crystal projector 100 of this embodiment has the following modes:

input image display mode: an image/video input from the image input unit 130 is displayed file reproduction display mode: the image of still image data or a video of moving image data read out from the recording medium 192 by the recording/reproduction unit 191 is displayed file reception display mode: the image of still image data or a video of moving image data received from the communication unit 193 is displayed Note that in this embodiment, a case in which the user selects one of the display modes will be explained. The display mode at the time of power-on can be the display mode at the previous time of end. Alternatively, one of the above-described display modes may be set as the default display mode. A description will be made here assuming that the "input image display mode" is selected in step S210.

When the "input image display mode" is selected, the CPU 110 determines in step S220 whether a video is input from the image input unit 130. Upon determining that no video is input (NO in step S220), the CPU 110 waits until input is detected. Upon determining that a video is input (YES in step S220), the CPU 110 executes projection processing (step S230).

In step S230, the CPU 110 transmits the video input from the image input unit 130 to the image processing unit 140. The image processing unit 140 executes processing concerning the number of pixels or frame rate of the video and shape change (image rotation or trapezoid distortion correction), and transmits the image of one processed frame to the liquid crystal control unit 150 under the control of the CPU 110. The liquid crystal control unit 150 controls the transmittances of the liquid crystal panels 151R, 151G, and 151B to transmittances corresponding to the tone levels of the (R), green (G), and blue (B) light components of the received image of one frame under the control of the CPU 110. The light source control unit 160 controls the light output from the light source 161 under the control of the CPU 110. The color separation unit 162 separates the light output from the light source 161 into red (R), green (G), and blue (B) light components and supplies the light components to the liquid crystal panels 151R, 151G, and 151B, respectively. For the light components of the respective colors supplied to the liquid crystal panels 151R, 151G, and 151B, the amount of light to pass through is limited for each pixel of the liquid crystal panels. The red (R), green (G), and blue (B) light components that have passed through the liquid crystal panels 151R, 151G, and 151B, respectively, are supplied to the color synthesis unit 163 and synthesized again. The light synthesized by the color synthesis unit 163 is projected on the screen (not shown) via the projection optical system 171. The above-described projection processing is sequentially executed for each frame image during the projection of the image.

Note that when a user instruction to operate the projection optical system 171 is input from the operation unit 113, the CPU 110 controls the actuator of the projection optical system 171 via the optical system control unit 170. This makes it possible to, for example, change the focus of the projected image or change the enlargement ratio of the optical system.

During the execution of projection processing, the CPU 110 determines whether a user instruction to switch the display mode is input from the operation unit 113 (step S240). If a user instruction to switch the display mode is input from the operation unit 113 (YES in step S240), the process returns to step S210, and the CPU 110 determines the display mode. At this time, the CPU 110 transmits a menu screen to select the display mode to the image processing unit 140 as an OBD image, and controls the image processing unit 140 to superimpose the OSD screen on the projected image. The use can select the display mode while viewing the projected OSD screen.

On the other hand, if no user instruction to switch the display mode is input from the operation unit 113 (NO in step S240), the CPU 110 determines whether a user instruction to end the projection is input from the operation unit 113 (step S250). If a user instruction to end the projection is input from the operation unit 113 (YES in step S250), the CPU 110 stops power supply to the respective blocks of the liquid crystal projector 100 and ends image projection. On the other hand, if no user instruction to end the projection is input from the operation unit 113 (NO in step S250), the process returns to step S220 to repeat the above-described processes of steps S220 to S250 until the user instruction to end the projection is input from the operation unit 113. As described above, in the "input image display mode", the liquid crystal projector 100 projects an image/video input from the image input unit 130 on the screen.

In the "file reproduction display mode", the recording/reproduction unit 191 reads out the file list of still image data or moving image data or the thumbnail data of each file from the recording medium 192, and temporarily stores it in the RAM 112. The CPU 110 generates a character image based on the file list temporarily stored in the RAM 112 or an image based on the thumbnail data of each file, and transmits it to the image processing unit 140. The CPU 110 controls the image processing unit 140, the liquid crystal control unit 150, the light source control unit 160, and the optical system control unit 170 as in the projection processing described in association with step S230.

On the projection screen, an instruction to select a character or image corresponding to still image data or moving image data recorded in the recording medium 192 is input via the operation unit 113. In accordance with the input of the instruction, the CPU 110 controls the recording/reproduction unit 191 to red out the selected still image data or moving image data from the recording medium 192. The CPU 110 temporarily stores the readout still image data or moving image data in the RAM 112, and reproduces the image of the still image data or the video of the moving image data by controlling the liquid crystal control unit 150 or the optical system control unit 170.

The CPU 110 sequentially transmits, for example, the reproduced video of the moving image data to the image processing unit 140, and controls the image processing unit 140, the liquid crystal control unit 150, and the optical system control unit 170 as in the projection processing described in association with step S230. When still image data is reproduced, the CPU 110 transmits the reproduced image to the image processing unit 140, and controls the image processing unit 140, the liquid crystal control unit 150, the light source control unit 160, and the optical system control unit 170 as in the projection processing described in association with step S230.

In the "file reception display mode", the CPU 110 temporarily stores, in the RAM 112, still image data or moving image data received from the communication unit 193, and reproduces the image of the still image data or the video of the moving image data. The CPU 110 sequentially transmits, for example, the reproduced video of the moving image data to the image processing unit 140, and controls the image processing unit 140, the liquid crystal control unit 150, and the optical system control unit 170 as in the projection processing described in association with step S230. When still image data is reproduced, the CPU 110 transmits the reproduced image to the image processing unit 140, and controls the image processing unit 140, the liquid crystal control unit 150, the light source control unit 160, and the optical system control unit 170 as in the projection processing described in association with step S230.

Figure 3:
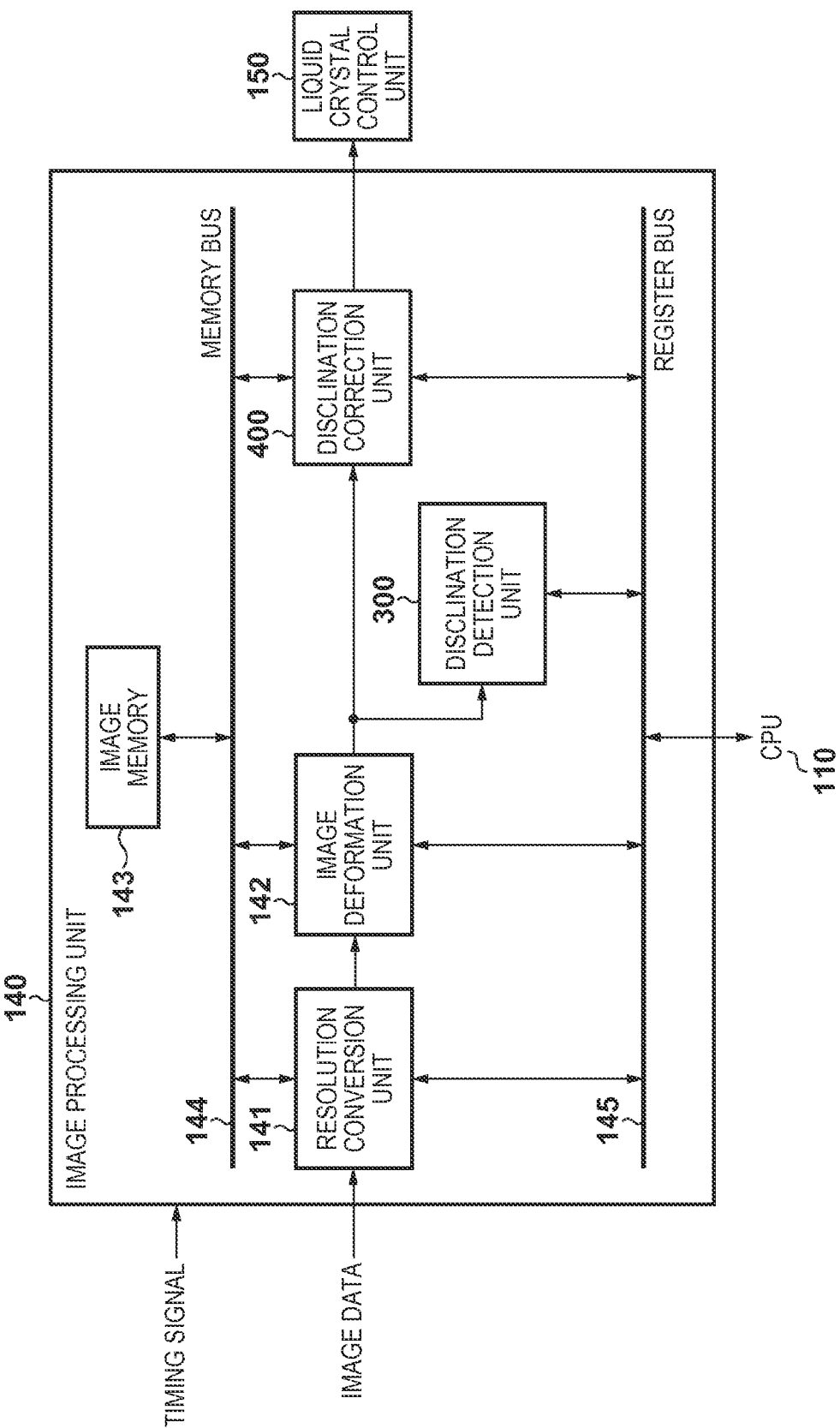
FIG. 3 is a block diagram showing an example of the arrangement of an image processing unit.

The arrangement and operation of disclination correction according so this embodiment will be described next. FIG. 3 is a block diagram showing the internal arrangement of the image processing unit 140 according to this embodiment. As shown in FIG. 3, the image processing unit 140 includes a resolution conversion unit 141, an image deformation unit 142, an image memory 143, a memory bus 144, a register bus 145, a disclination detection unit 300, and a disclination correction unit 400.

The image processing unit 140 receives image data (to be also referred to as an image signal) and a timing signal from the image input unit 130. The timing signal input to the image processing unit 140 is supplied to the resolution conversion unit 141, the image deformation unit 142, the disclination detection unit 300, and the disclination correction unit 400. The resolution conversion unit 141 converts the image input from the image input unit 130 into a resolution suitable for a liquid crystal panel 151. The image deformation unit 142 performs rotation or trapezoid distortion correction, as needed, for the image converted by the resolution conversion unit 141. The image memory 143 is a memory used for image processing by the resolution conversion unit 141, the image deformation unit 142, and the disclination correction unit 400, and is connected to the respective blocks via the memory bus 141. The resolution conversion unit 141, the image deformation unit 142, the disclination detection unit 300, and the disclination correction unit 400 are connected to the CPU 110 via the register bus 145.

Figure 4:
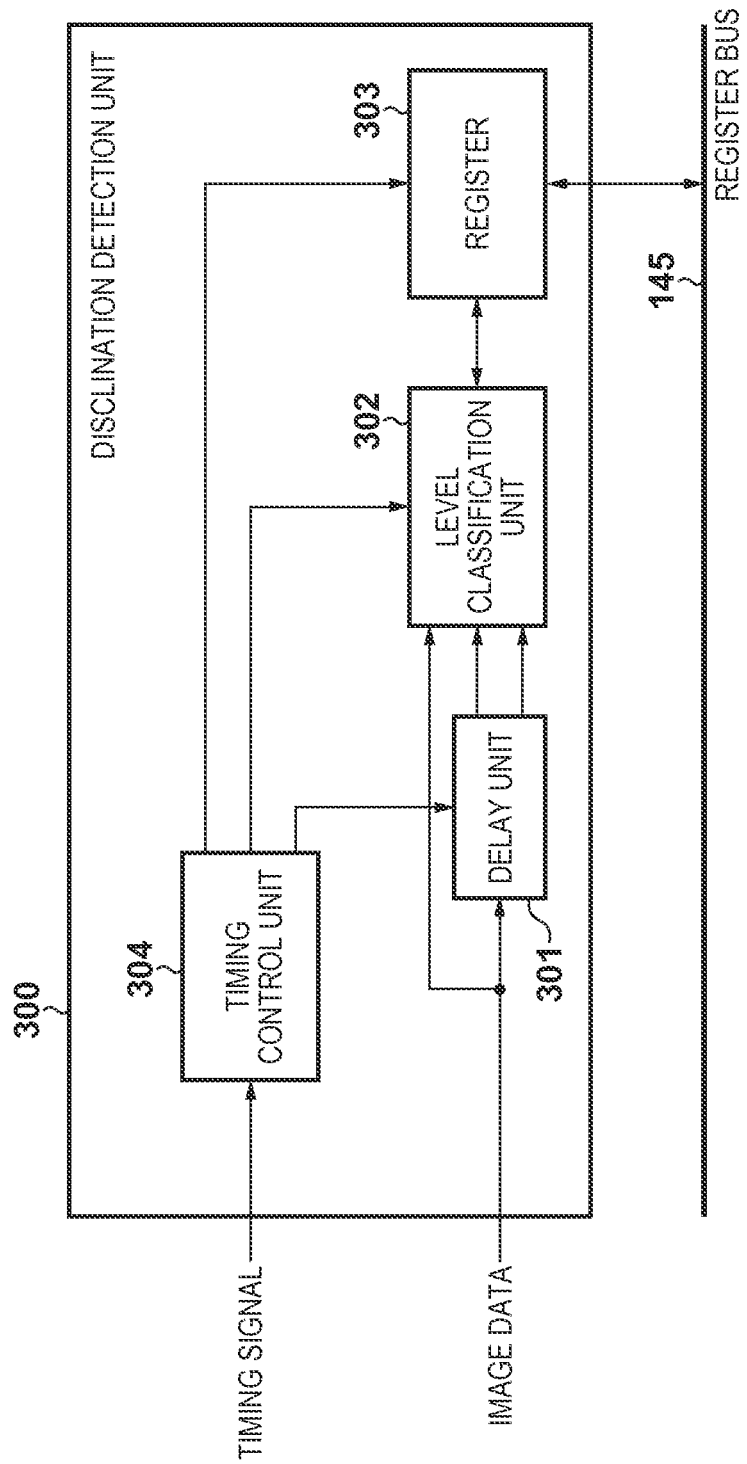
FIG. 4 is a block diagram showing an example of the arrangement of a disclination detection unit.

The disclination detection unit 300 will be described next with reference to FIGS. 4 to 6. FIG. 4 is a block diagram showing the internal arrangement of the disclination detection unit 300.

The disclination detection unit 300 receives image data and a timing signal. The image data is input to a delay unit 301 and a level classification unit 302. The delay unit 301 outputs image data delayed from the input image data by one line and one pixel and image data delayed by one pixel under the control of a timing control unit 304.

The level classification unit 302 receives three kinds of data, that is, the image data, and the image data delayed by one line and one pixel and the image data delayed by one pixel which are output from the delay unit 301. The level classification unit 302 counts the number of pixels judged to cause a disclination based on the three data and a threshold stored in a register 303, and stores the count value in the register 303 as a totalization result of image data of one frame. The threshold will be described later.

The operation of the level classification unit 302 will be described next with reference to FIG. 5A. In FIG. 5A, 50a represents three kinds of data input to the level classification unit 302. A pixel B indicates the position of image data input to the disclination detection unit 300. A pixel A indicates the position of "image data delayed by one pixel", which is output from the delay unit 301. A pixel C indicates the position of "image data delayed by one line and one pixel", which is output from the delay unit 301. The level classification unit 302 performs level comparison based on the pixel value of the pixel A corresponding to the image data delayed by one pixel. That is, the level classification unit 302 compares the level, of the reference pixel A with that of the right adjacent pixel B, and also compares the level of the reference pixel A with that of the upper adjacent pixel C.

Before a description of a detailed level comparison operation, patterns to cause a disclination will be explained using 50b to 50e in FIG. 5A. The disclination is a phenomenon that takes place when the potential difference between adjacent pixels is large. Hence, there are two patterns to cause a disclination between the pixel A and the pixel B. The first occurrence pattern is a pattern in which the pixel A has a halftone, and the pixel B has a tone close to the black tone. In this case, a potential difference is generated between the pixel A and the pixel B. For this reason, a disclination occurs in the hatched portion of the pixel A, as indicated by 50b in FIG. 5A. The second occurrence pattern is a pattern in which the pixel A has a tone close to the white tone, and the pixel B has a halftone. In this case as well, a potential difference is generated between the pixel A and the pixel B. For this reason, a disclination occurs in the hatched portion of the pixel A, as indicated by 50c in FIG.

As described above, there exist two disclination occurrence patterns between pixels changing from the black tone to the halftone and between pixels changing from the halftone to the white tone. Between the pixel A and the pixel C as well, two occurrence patterns exist, as indicated by 50d and 50e in FIG. 5A, like between the pixel A and the pixel B. Hence, there are a total of four disclination occurrence patterns including the two occurrence patterns in the horizontal direction and the two occurrence patterns in the vertical direction.

Disclination detection processing of the level classification unit 302 will be described next using feature condition classification matrices 51a to 51d shown in FIG. 5B. The level classification unit 302 performs comparison using thresholds $AL_n$ (n=0 to 4), $AH_n$ (n=0 to 3), $BL_n$ (n=0 to 1), $BH_n$ (n=0 to 2), $CL_n$ (n=0 to 1), and $CH_n$ (n=0 to 2) for comparison which are set in the register 303 by the CPU 110.

The feature condition classification matrix 51a shown in FIG. 5B is used to count disclination occurrence patterns as indicated by 50b in FIG. 5A. That is, in this pattern, the pixel A has the halftone, and the pixel B has the tone close to the black tone. For example, when the level of the reference pixel A ranges from $AL_0$ (inclusive) to $AL_1$ (inclusive), and the level of the adjacent pixel B ranges from $BL_0$ (inclusive) to $BL_1$ (inclusive), a feature amount counter ABL00 is incremented. The more the count values of the feature amount counters ABL00 to ABL03 are totalized in the feature condition classification matrix 51a in FIG. 5B, the more the disclinations occur in the image data. The potential difference between the pixel A and the pixel B becomes larger rightward in the feature condition classification matrix. Hence, a more conspicuous disclination occurs in the pixels totalized in ABL03 than in the pixels totalized in ABL00.

The feature condition classification matrix 51b shown in FIG. 5B is used to count disclination occurrence patterns (pixels predicted to cause a disclination) as indicated by 50c in FIG. 5A. That is, in this pattern, the pixel A has the tone close to the white tone, and the pixel B has the halftone. In this case, the thresholds of the pixel A are set to $AH_0$ to $AH_3$, and the thresholds of the pixel B are set to $BH_0$ to $BH_2$. A total of 2×3=6 feature amount counters ABH00 to ABH12 totalize the number of patterns (number of pixels) matching the conditions.

The feature condition classification matrices 51c and 51d in FIG. 5B are used to count disclination occurrence patterns corresponding to 50d and 50e in FIG. 5A. Feature amount counters corresponding to the feature condition classification matrices for 50d and 50e in FIG. 5A are ACL00 to ACL03 and ACH00 to ACH12. These feature condition classification matrices and feature amount counters are the same as in comparing the pixel A and the pixel B, and a description thereof will be omitted.

The above-described thresholds $AL_n$ (n=0 to 4), $AH_n$ (n=0 to 3), $BL_n$ (n=0 to 1), $BH_n$ (n=0 to 2), $CL_n$ (n=0 to 1), and $CH_n$ (n=0 to 2) are values depending on the liquid crystal element or the bit width of image data. These thresholds are set in the register 303 by the CPU 110 in advance before the level classification unit 302 starts totalization processing.

Note that these thresholds may be changeable by the user. The user may select a threshold set prepared in advance.

Note that in this embodiment, the four feature condition classification matrices 51a to 51d shown in FIG. 5B for a relatively large degradation caused by a disclination are employed as feature condition classification matrices. However, the condition classifications are not limited to those, and other conditions may be used. For example, a simple condition to count an occurrence pattern when the pixel value difference between adjacent pixels is equal to or larger than a predetermined value may be added. In addition, settings of the thresholds ALn (n=0 to 4), AHn (n=0 to 3), BLn (n=0 to 1), BHn (n=0 to 2), CLn (n=0 to 1), and CHn (n=0 to 2) are merely examples, and any other combination may be used, as a matter of course.

Figure 6A:
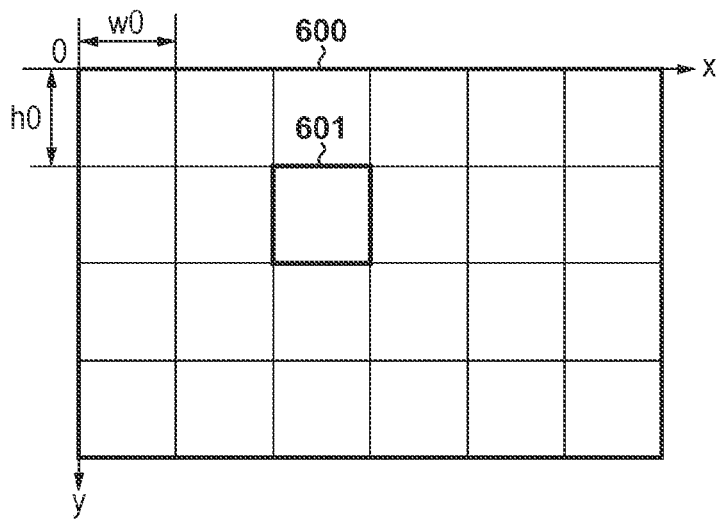
FIGS. 6A to 6C are views showing an example of block division for disclination detection and correction.

The range of count processing of the level classification unit 302 will be described next with reference to FIG. 6A. Display target image data is divided into a plurality of blocks, as shown in FIG. 6A. Totalization of the number of pixels predicted to cause a disclination is done for each block 601 obtained by dividing image data 600 indicated by the thick line in FIG. 6A into a plurality of blocks. FIG. 6A illustrates an example in which the image data 600 is segmented at an interval h0 in the vertical direction and an interval w0 in the horizontal direction and thus divided into 4 (vertical)×6 (horizontal)=24 blocks 601.

Totalization by the above-described four kinds of feature amount counters ABL00 to ABL03, ABH00 to ABH12, ACL00 to ACL03, and ACH00 to ACH12 is independently performed for each block. That is, in the example shown in FIG. 6A, the feature amount counters are independently provided for each of the total of 4 (vertical)×6 (horizontal)=24 blocks, and independently perform counting. Note that the intervals w0 and h0 are decided in accordance with the number of divisions of image data. That is, when dividing the entire image data into 4 (vertical)×6 (horizontal) blocks, w0 and h0 are decided in accordance with the number of pixels included in one block. Note that the number of divisions of image data is not limited to 4 (vertical)×6 (horizontal), and can be changed in accordance with the size of the input image. The number of divisions may be decided in accordance with the size of the image while fixing the size of a divided block.

The disclination correction unit 400 will be described next with reference to FIGS. 7 to 9. FIG. 7 is a block diagram showing the internal arrangement of the disclination correction unit 400. A timing control unit 401 controls the operation timing of each block based on a timing signal. A register 402 is connected to the CPU 110 via the register bus 145 and stores correction data (top and btm of each block to be described later) for disclination correction.

A buffer 403 temporarily stores correction data read out from the register 402 in correspondence with an image position. The correction data read out from the register 402 is temporarily stored in the buffer 403 and output from the buffer 403 at a timing controlled by the timing control unit 401. Interpolation units 404 and 405 perform the interpolation operation of the correction data from the buffer 403. Horizontal space interpolation units 406 to 409 perform the interpolation operation of the correction data in the horizontal direction. Vertical space interpolation units 410 and 411 perform the interpolation operation of the correction data in the vertical direction. A level correction unit 412 corrects the tone level of image data by data from the vertical space interpolation units 410 and 411. Interpolation processing of the horizontal space interpolation units 406 to 409, the vertical space interpolation units 410 and 411, and the level correction unit 412 will be described later.

The relationship between image data and correction data for a disclination will be described next with reference to FIG. 6B. The correction data for a disclination are arranged in the centers of the respective blocks at the interval w0 in the horizontal direction and the interval h0 in the vertical direction, as indicated by full circles 602 in FIG. 6B. Two kinds of correction data including an upper limit value top of the tone adjusted on the white side and a lower limit value btm of the tone adjusted on the black side are assigned to each point represented by the full circle 602, and details will be described later.

Figure 6B:
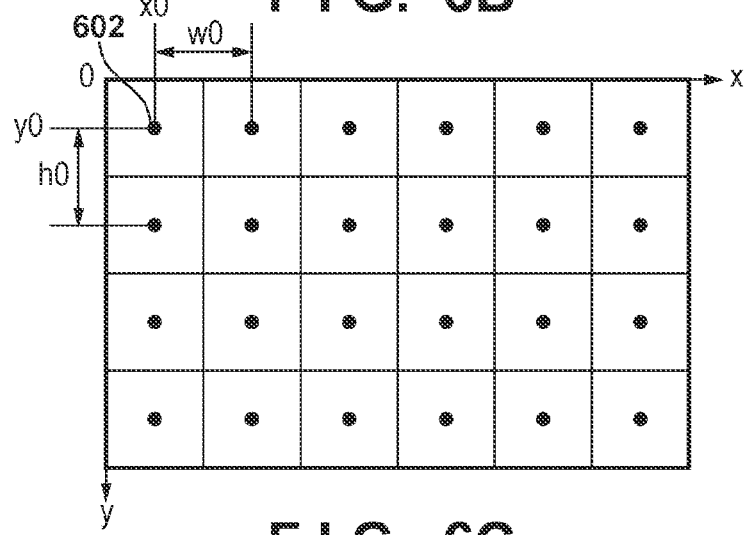

FIG. 6B illustrates an example in which image data is divided into 4 (vertical)×6 (horizontal) blocks, and a correction data readout point is arranged at the center of each block. Note that the intervals w0 and h0 are decided in accordance with the number of divisions of image data. That is, when dividing the entire image data into 4 (horizontal)×6 (vertical) blocks, w0 and h0 are decided in accordance with the number of pixels included in one block. Note that the number of divisions of image data is not limited to 4 (horizontal)×6 (vertical), and can be changed in accordance with the size of the input image. The number of divisions may be decided while fixing the size of a divided block.

The operation of the interpolation unit 404 will be described next with reference to FIG. 8. Note that the interpolation unit 404 is formed from the horizontal space interpolation units 406 and 407 and the vertical space interpolation unit 410, and performs interpolation processing of reducing disclinations that occur near the white tone. Details will be described later together with the operation of the level correction unit 412.

Figure 8:
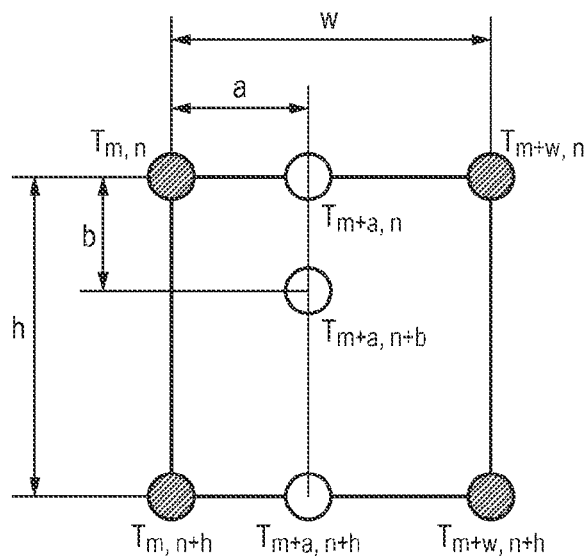
FIG. 8 is a view for explaining space interpolation of correction data.
Figure 9:
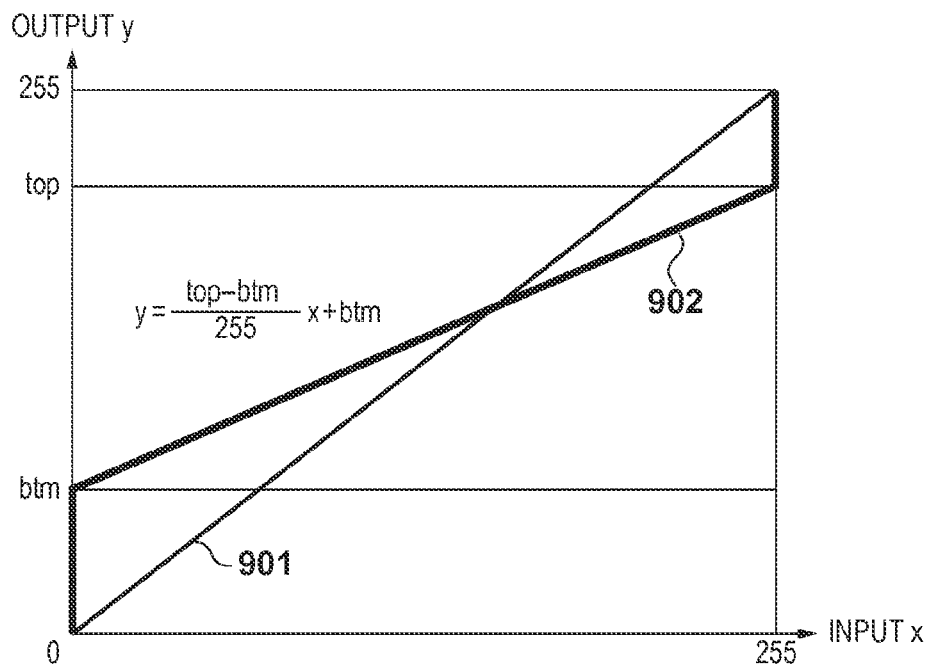
FIG. 9 is a view for explaining level correction.

Referring to FIG. 8, the correction data is expressed by four full circles $T_{m,n}$, $T_{m+w,n}$, $T_{m,n+h}$, and $T_{m+w,n+h}$. In FIG. 8, the correction target position is expressed by an open circle $T_{m+a,n+b}$ at a position included in a rectangle having the four full circles at the vertices. Upper and lower open circles $T_{m+a,n}$ and $T_{m+a,n+h}$ express output data of the horizontal space interpolation units 406 and 407, respectively. Note that the correction data are read out from the buffer 403 no the horizontal space interpolation units 406 and 107 under the control of the timing control unit 401.

First, the correction data $T_{m,n}$ and the correction data $T_{m+w,n}$ separated by w pixels rightward (in the x direction) are input to the horizontal space interpolation unit 106. To generate correction data $T_{m+a,n}$ at a point separated rightward by a pixels from the readout point of $T_{m,n}$, the horizontal space interpolation unit 406 performs an operation represented by $$T_{m+a,n}=T_{m,n}\times\{(w-a)/w\}+T_{m+w,n}\times(a/w) \qquad (1)$$

At the same timing as the correction data supply to the horizontal space interpolation unit 406, the horizontal space interpolation unit 407 receives the correction data $T_{m,n+h}$ at the position separated downward by h lines from the correction data input to the horizontal space interpolation unit 406, and the correction data $T_{m+w,n+h}$ at the position separated rightward by w pixels from that position.

To generate correction data $T_{m+a,n+h}$ at a point separated rightward by a pixels from the readout point of $T_{m,n+h}$, the horizontal space interpolation unit 407 performs an operation represented by $$T_{m+a,n+h}=T_{m+a,n+h}\times\{(w-a)/w\}+T_{m+a,n+h}\times(a/w) \qquad (2)$$

Next, the vertical space interpolation unit 410 receives the data and $T_{m+a,n}$ and $T_{m+a,n+h}$ obtained by horizontal interpolation by the horizontal space interpolation units 406 and 407. The vertical space interpolation unit 410 performs vertical interpolation based on the two received data. To generate correction data $T_{m+a,n+b}$ at a point separated downward by b lines from the data $T_{m+a,n}$ generated by interpolation, the vertical space interpolation unit 410 performs an operation represented by $$T_{m+a,n+b}=T_{m+a,n}\times\{(h-b)/h\}+T_{m+a,n+h}\times(b/h) \quad (3)$$

With the above-described operation, the vertical space interpolation unit 410 outputs the correction data $T_{m+a,n+b}$ generated by interpolation from the correction data of the four white-side upper limit values top in the periphery. Similarly, the interpolation unit 405 including the horizontal space interpolation units 408 and 409 and the vertical space interpolation unit 411 outputs correction data $B_{m+a,n+b}$ generated by interpolation from the correction data of the four black-side lower limit values btm in the periphery.

The disclination correction operation of the level correction unit 412 will be described next with reference to FIG. 9. The level correction unit 412 performs disclination correction using the image data and the correction data $T_{m+a,n+b}$ and $B_{m+a,n+b}$ generated by interpolation. The level correction unit 412 is a block having an input/output characteristic 902 shown in FIG. 9. The level correction unit 412 receives the upper limit value top (=$T_{m+a,n+b}$) and the lower limit value btm (=$B_{m+a,n+b}$) from the vertical space interpolation units 410 and 411, respectively. The level correction unit 412 also receives the pixel values of correction target pixels corresponding to the positions on the screen for which the upper limit value top and the lower limit value btm are calculated out of the display target image data. The dynamic range of the driving voltage of the liquid crystal element is reduced by the input/output characteristic 902. Since the driving voltage difference between adjacent pixels of the correction target pixels is reduced, disclination correction is implemented. If the disclination correction is not performed, the value on the upper limit side of the tone range of the pixels becomes 255, and the value on the lower limit side becomes 0. Hence, an input/output characteristic 901 is obtained. Note that FIG. 9 illustrates an example in which the pixel value data has 8 bits. However, the number of bits is not limited to this.

Figure 6C:
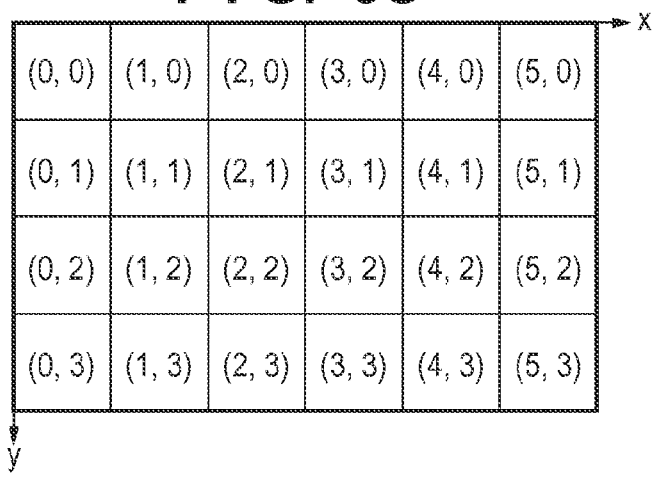
Figure 10:
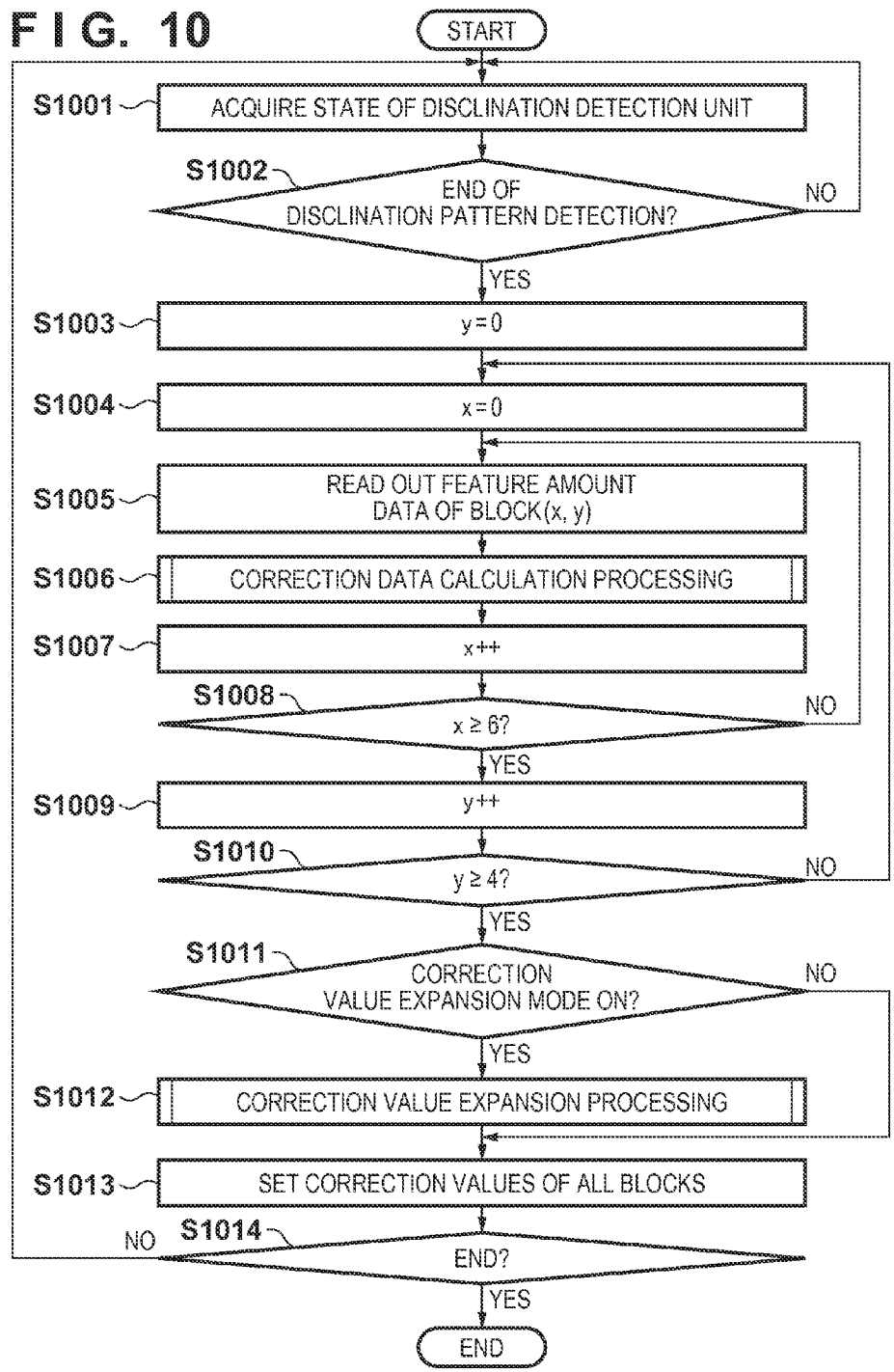
FIG. 10 is a flowchart showing disclination correction processing.

Disclination correction processing by the CPU 110 will be described next with reference to FIGS. 10 to 14C. FIG. 10 is a flowchart for explaining the procedure of disclination correction by the CPU 110. The flowchart of FIG. 10 will be described by exemplifying a case in which disclination detection and correction are performed for an image divided into a total of 4 (vertical)×6 (horizontal)=24 blocks, as shown in FIGS. 6A and 6B. For the descriptive convenience, each block will be represented by (x, y) (x=0 to 5, y=0 to 3), as shown in FIG. 6C.

After power-on, the processing shown in FIG. 10 starts. In step S1001, the CPU 110 acquires the state of the disclination detection unit 300 by referring to the register 303 of the disclination detection unit 300. In step S1002, the CPU 110 determines, based on the state acquired in step S1001, whether the disclination detection unit 300 has ended disclination pattern detection. If the disclination pattern detection has not ended in step S1002, the process returns to step S1001 to repeat steps S1001 and S1002. If the disclination pattern detection has ended, the CPU 110 initializes the variables x and y to 0 in steps S1003 and S1004. After that, the CPU 110 reads out the feature amount counters ABL00 to ABL03, ABH00 to ABH12, ACL00 to ACL03, and ACH00 to ACH12 of the block (x, y) from the register 303 of the disclination detection unit 300. In step S1006 after reading out the feature amount counters, the CPU 110 performs correction data calculation processing to be described later based on the readout feature amount counters in step S1006, thereby calculating the correction data top and btm of the block (x, y).

The above-described correction data calculation processing (steps S1005 and S1006) is repeated until the correction data are calculated for all blocks (in this embodiment, a total of 4 (vertical)×6 (horizontal)=24 blocks) in steps S1007 to S1010. Hence, the CPU 110 increments the variable x, and determines whether x is equal to or larger than 6. If x is smaller than 6, the CPU 110 repeats the processes of steps S1005 to S1008. If x is equal to or larger than 6, the CPU 110 increments the variable y (step S1009), and determines whether y is equal to or larger than 4 (step S1010). If y is smaller than 4, the CPU 110 repeats the processes of steps S1004 to S1010. If y is equal to or larger than 4, the process advances to step S1011.

In step S1011, the CPU 110 determines whether the correction value expansion mode is on (step S1011). The correction value expansion mode is a mode to modify the correction value of each block based on the correction value calculated for each block and the correction values of peripheral blocks. Details of the correction value expansion processing will be described later. Note that on/off of the correction value expansion mode can be either written in the ROM 111 in advance or changed by a user instruction. If the correction value expansion mode is off, the process directly advances to step S1013. If the correction value expansion mode is on, the correction value expansion processing is executed (step S1012). Next, the CPU 110 writes the correction data top and btm calculated for all blocks (x, y) (x=0 to 5, y=0 to 3) in the register 402 of the disclination correction unit 400 (step S1013). After that, in step S1014, the CPU 110 confirms whether an end instruction from the user exists. If no instruction exists, the process returns to step S1001 to repeat the processes of steps S1001 to S1014. If an end instruction is input, the processing ends.

Figure 11:
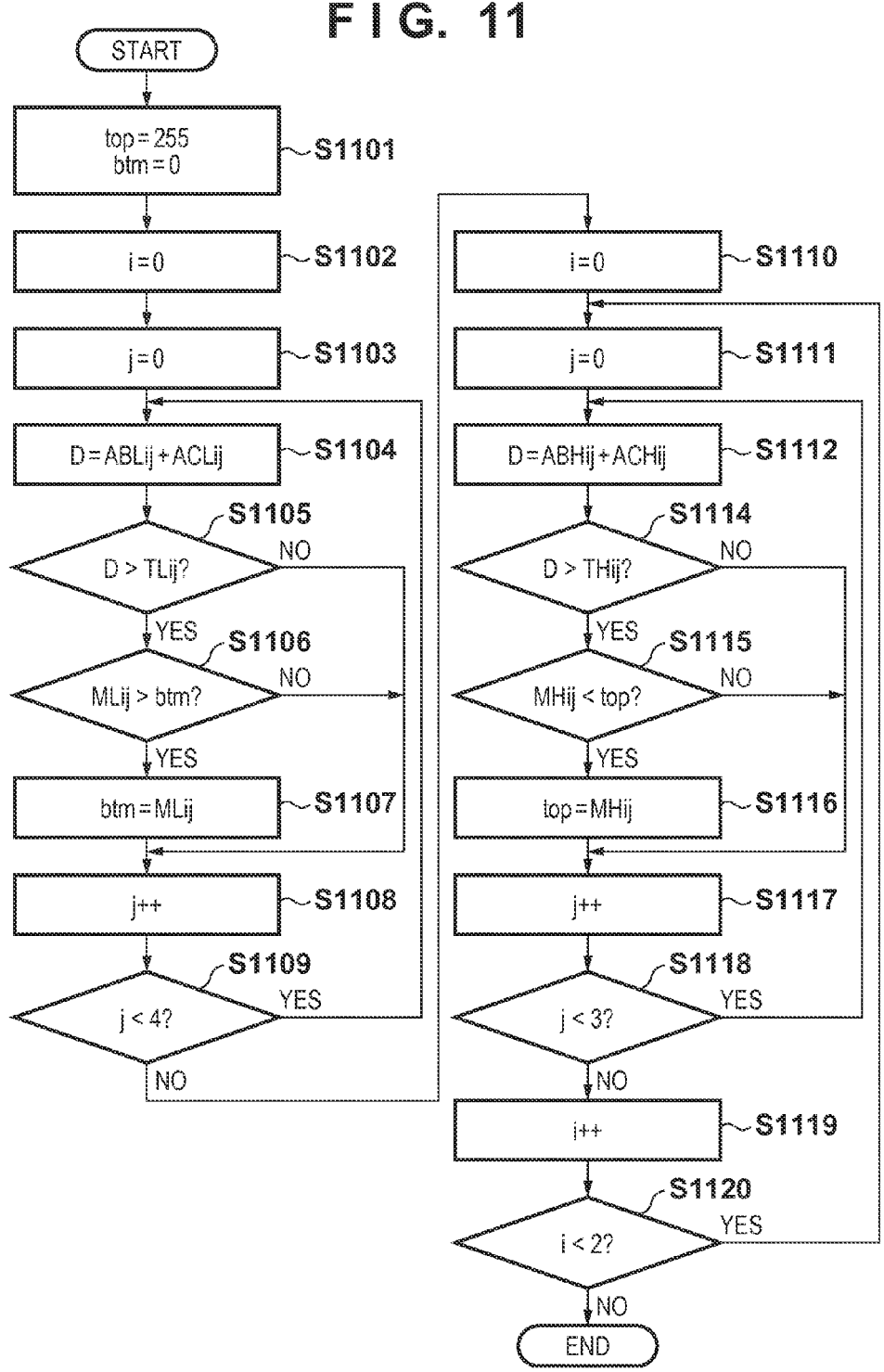
FIG. 11 is a flowchart showing correction value calculation processing.
Figure 13B:
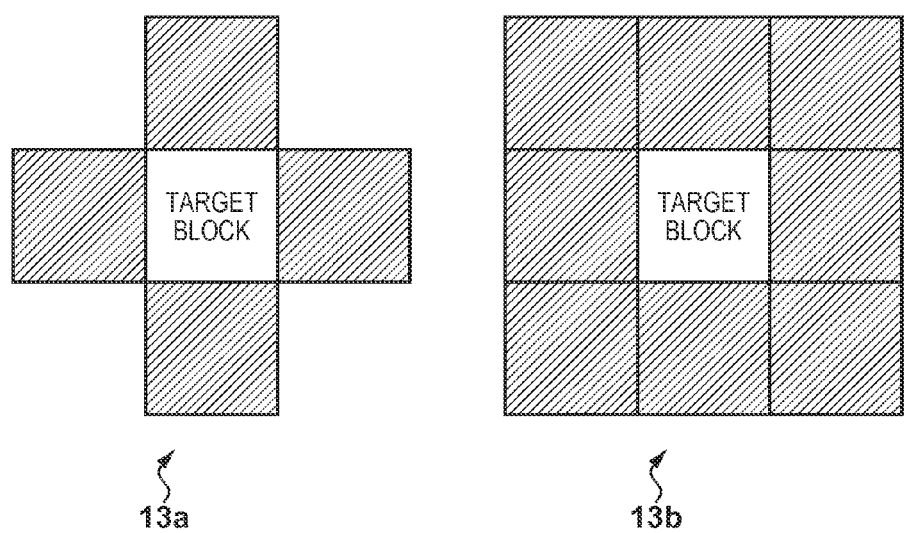
FIG. 13B is a view for explaining peripheral blocks in correction value expansion processing.

Correction data calculation processing of step S1006 in FIG. 10 will be described next with reference to FIG. 11. When the correction data calculation processing starts, the CPU 110 substitutes 255 to the variable top and 0 to btm in step S1101.

The processes of steps S1102 to S1109 to be described below are processes for calculating the correction value btm. In steps S1102 and S1103, the CPU 110 initializes variables i and j to 0. In step S1104, the CPU 110 adds the feature amount counters ABLij and ACLij and substitutes the sum to a variable D. In step S1105, the CPU 110 refers to a threshold table shown in FIG. 12A and determines whether the variable D is larger than a threshold TLij.

Note that the threshold table shown in FIG. 12A is saved in the ROM 111 in advance. The value TLij saved in the threshold table is arbitrarily set in accordance with, for example, the characteristic of the liquid crystal element. Note that the threshold table shown in FIG. 12A corresponds to the feature condition classification matrices 51a and 51c in FIG. 5B. When the sizes of the feature condition classification matrices are changed, the size of the threshold table needs to be changed as well.

Is the variable D is equal to or smaller than the threshold TLij, the process advances to step S1108. If the variable D is larger than the threshold TLij, the process advances to step S1106. In step S1106, the CPU 110 refers to a correction value table shown in FIG. 12B, acquires a correction value MLij, and compares it with the variable btm.

Note that the correction value table shown in FIG. 12B is saved in the ROM 111 in advance, like the threshold table. The correction value table is arbitrarily set in accordance with, for example, the characteristic of the liquid crystal element, like the threshold table. Note that the correction value table shown in FIG. 12B corresponds to the feature condition classification matrices 51a and 51c in FIG. 5B, like the threshold table. Hence, when the sizes of the feature condition classification matrices are changed, the size of the correction value table needs to be changed as well.

If the correction value MLij is equal to or smaller than the variable btm in step S1106, the process advances to step S1108. On the other hand, if the correction value MLij is larger than the variable btm, the process advances to step S1107, and the CPU 110 substitutes MLij into the variable btm, thereby updating btm. In step S1108, the CPU 110 increments the variable j and determines whether the variable j is smaller than 4 (step S1109). If the variable j is smaller than 4, the process returns to step S1104 to repeat the processes of steps S1104 to S1109. In this way, the processes of steps S1104 to S1107 are executed for all feature amount counters provided in correspondence with the feature condition classification matrices 51a and 51c shown in FIG. 5B.

The processes of steps S1110 to S1120 will be described next. The processes of steps S1110 to S1120 are processes for calculating the correction value top. In steps S1110 and S1111, the CPU 110 initializes the variables i and j to 0. In step S1112, the CPU 110 adds the feature amount counters ABHij and ACHij and substitutes the sum to the variable D. In step S1114, the CPU 110 refers to a threshold table shown in FIG. 12C, which is saved in the ROM 111 in advance, and determines whether the variable D is larger than a threshold THij. Note than the threshold tables shown in FIG. 12C and FIG. 12D to be described later are saved in the ROM 111 in advance. The value THij saved in the threshold table is arbitrarily set in accordance with, for example, the characteristic of the liquid crystal element. The threshold tables shown in FIGS. 12C and 12D correspond to the feature condition classification matrices 51b and 51d in FIG. 5B. When the sizes of the feature condition classification matrices are changed, the sizes of the threshold tables need to be changed as well.

If the variable D is equal to or smaller than the threshold THij, the process advances to step S1117. If the variable D is larger than the threshold THij, the process advances to step S1115. In step S1115, the CPU 110 refers to a correction value table shown in FIG. 12D, which is saved in the ACM 111 in advance, and determines whether a correction value MHij is smaller than the variable top.

If the correction value MHij is equal to or larger than the variable top, the process advances to step S1117. If the correction value MHij is smaller than the variable top, the process advances to step S1116. In step S1116, the CPU 110 substitutes MHij into the variable top. In step S1117, the CPU 110 increments the variable j. In step S1118, the CPU 110 determines whether the variable j is smaller than 3. If the variable j is smaller than 3, the process returns to step S1112. In this way, the processes of steps S1112 to S1118 are repeated until the variable j becomes equal to or larger than 3. If the variable j is equal to or larger than 3, the CPU 110 increments the variable i (step S1119). If the variable i is smaller than 2, the process returns to step S1111 (step S1120). If the variable i is equal to or larger than 2, the processing ends. As a result, the processes of steps S1111 to S1120 are repeated until the variable i becomes equal to or larger than 2. In this way, the processes of steps S1112 to S1116 are executed for all feature amount counters provided in correspondence with the feature condition classification matrices 51b and 51d shown in FIG. 5B.

When the above-described processing is performed, the maximum correction value is set in the variable btm, and the minimum correction value is set in the variable top.

Correction value expansion processing of step S1012 in FIG. 10 will be described next with reference to FIG. 13A. When the correction value expansion processing starts, in step S1301, the CPU 110 temporarily copies the correction values of all blocks to the work area. The values copied to the work area are used in steps S1305 and S1306. The correction values of all blocks are temporarily copied to the work area to hold the original correction values before the correction value expansion processing.

In steps S1302 and S1303, the CPU 110 initializes the variables x and y to 0. In step S1304, the CPU 110 confirms whether the number of reference blocks is 4. The number of reference blocks is recorded in the ROM 111 in advance. If the number of reference blocks is 4, the process advances to step S1305. In step S1305, the CPU 110 acquires, as the correction values of blocks around the target block, the correction values of four blocks indicated by hatched portions 13a in FIG. 13B and being adjacent to the target block in the vertical and horizontal directions from the work area to which the correction values are copied in step S1301. On the other hand, if the number of reference blocks is not 4, the process advances to step S1306. In step S1306, the CPU 110 acquires, as the correction values of blocks around the target block, the correction values of eight blocks indicated by hatched portions 13b in FIG. 13B and surrounding the target block from the work area to which the correction values are copied in step S1301. After correcting the correction values of the peripheral blocks, in step S1307, the CPU 110 compares the acquired correction values of the peripheral block with the correction value of the block (x, y), and sets the maximum correction value as the correction value of the block (x, y). Note than the expansion processing can be executed for both of btm and top or only one of them. For btm, the maximum value is the maximum correction value. For top, the minimum value is the maximum correction value.

After setting the correction value, the CPU 110 increments the variable x (step S1308). If the variable x is smaller than 6 the process returns to step S1304 (step S1309). In this way, the processes of steps S1304 to S1309 are repeated until the variable x becomes equal to or larger than 6. If the variable x is equal to or larger than 6, the CPU 110 increments the variable y (step S1310). If the variable y is smaller than 4, the process returns to step S1303 (step S1311). If the variable y is equal to or larger than 4, the process ends. In this way, the processes of steps S1303 to S1311 are repeated until the variable y becomes equal to or larger than 4.

Figure 14A:
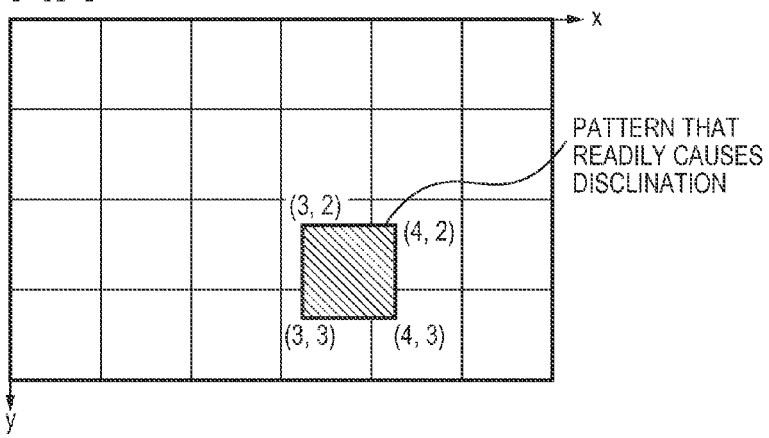
FIGS. 14A to 14C are views for explaining the correction image of correction value expansion processing.
Figure 14B:
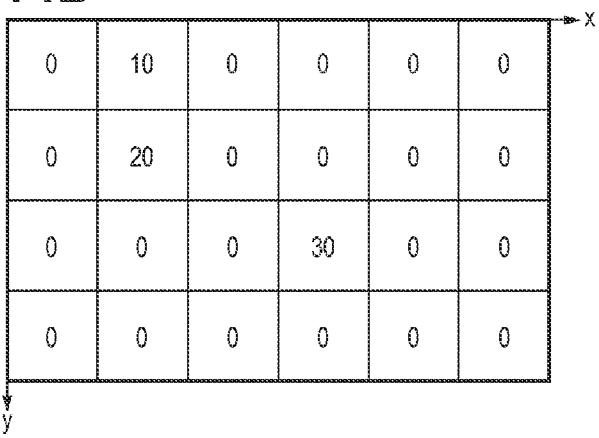
Figure 14C:
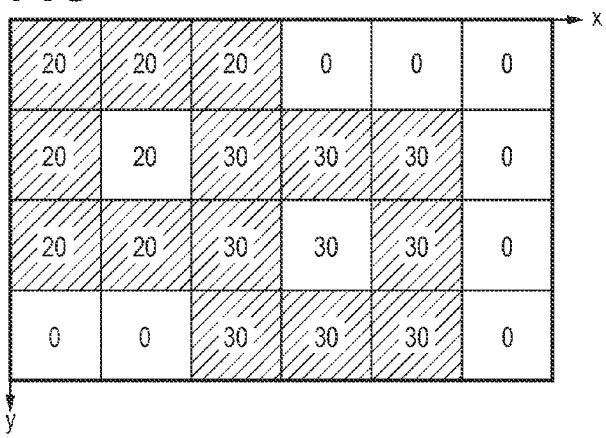

The correction image of correction value expansion processing will be described with reference to FIGS. 14A to 14C. FIG. 14A schematically illustrates an image in which a pattern that readily causes a disclination exists over blocks (3, 2) to (4 3). FIG. 14B illustrates an example in which the correction value (btm in this case) is calculated for the image shown in FIG. 14A, and shows a state before the correction value expansion processing is applied. FIG. 14C illustrates a state after the correction value expansion processing is applied to the correction value calculation result shown in FIG. 14B by referring to the nine peripheral blocks. Note that the blocks indicated by the hatched portions in FIG. 14C represent blocks whose correction values have been changed by the correction value expansion processing.

When the correction value expansion processing is not performed, the correction value of the block (3, 2) is "30", and the correction values of the adjacent blocks are "0", as shown in FIG. 14B. In this case, the correction value applied to each edge of the block (3, 2) is "15" by the interpolation processing described with reference to FIG. 8, resulting in undercorrection. For each of the blocks (4, 2), (3, 3), and (4, 3), since the ratio of the area of the pattern that readily causes a disclination to the area of the block is small, as shown in FIG. 14A, the value of the feature amount counter is small. As a result, the correction value becomes 0, and disclination correction is not performed.

However, when the above-described correction value expansion processing is applied, the blocks (4, 2), (3, 3), and (4, 3) have the same correction value as that of the block (3, 2), as shown in FIG. 14C. For this reason, appropriate disclination correction can be applied to the entire block (3, 2). For the blocks (4, 2), (3, 3), and (4, 3), disclination correction of the same intensity as the block (3, 2) is applied to the portions adjacent to the block (3, 2).

When the correction value expansion processing is performed, the dynamic range of the image becomes narrow. However, if a pattern that readily causes a disclination exists at a block boundary, as shown in FIG. 14A, disclination occurrence can effectively be suppressed.

As described above, in the first embodiment, disclination correction can be performed without lowering the sharpness of an image by performing disclination correction for each divided block of the image data. That is, it is possible to reduce disclinations while reducing a degradation in image quality of the image signal after correction. In addition, when deciding the correction value, the correction amount is decided by referring to peripheral blocks. This makes it possible to prevent disclination occurrence even when a pattern that readily causes a disclination exists near a block boundary.

[Second Embodiment]

In the second embodiment, a modification of correction value expansion processing described in the first embodiment will be explained. The arrangement and operation of a liquid crystal projector 100 according to the second embodiment are the same as in the first embodiment (FIGS. 1 to 12) except correction value expansion processing. Correction value expansion processing according to the second embodiment will be described below.

Figure 15:
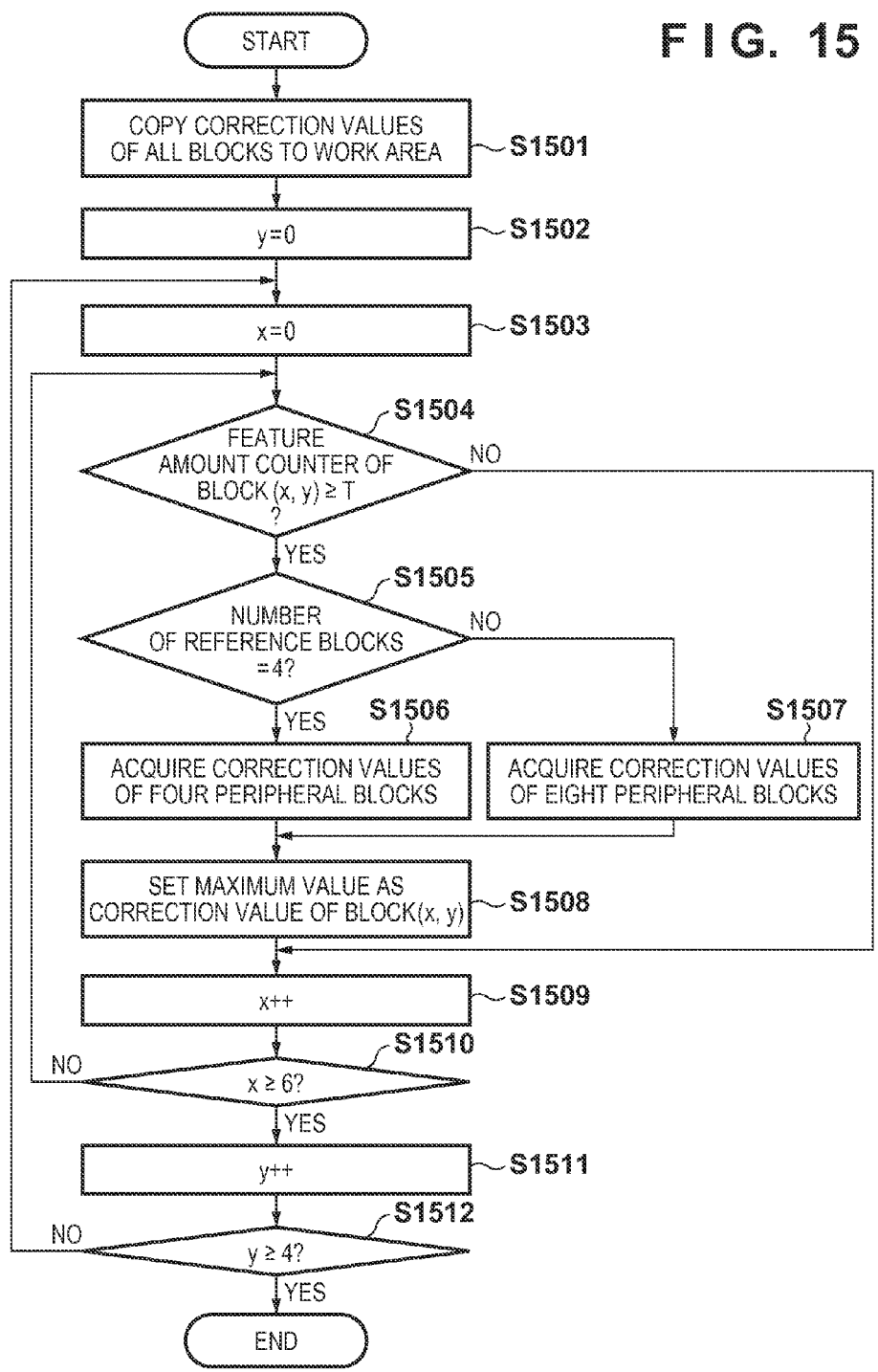
FIG. 15 is a flowchart showing correction value expansion processing according to the second embodiment.

FIG. 15 is a flowchart showing the procedure of correction value expansion processing according to the second embodiment. Note that the processes of steps S1501 to S1503 and S1505 to S1512 in FIG. 15 are the same as the processes of steps S1301 to S1311.

In step S1504, a CPU 110 determines whether any one of feature amount counters ABLi (i=0 to 3), ABHij (i=0 to 1, j=0 to 2), ACLi (i=0 to 3), and ACHij (i=0 to 1, j=0 to 2) of a block (x, y) is equal to or larger than a predetermined value T. If one of the feature amount counters is equal to or larger than the threshold T, correction value expansion processing in steps S1505 to S1508 is executed. If all of the feature amount counters of the block (x, y) are smaller than the predetermined value T, the process advances to step S1509 while skipping correction value expansion processing. Note that as the feature amount counters, values acquired in step S1005 of FIG. 10 are used.

The effect of the above-described processing will be described here. Each feature amount counter represents the number of pixels predicted to cause a disclination. The larger the number of pixels is, the more conspicuously disclination occurrence is visually recognized. Conversely, the smaller the number of pixels is, the less a disclination affects image quality. On the other hand, when disclination correction is performed using a large correction value, the dynamic range of the image is largely compressed, as described with reference to FIG. 9. As described above, if the feature amount counter is equal to or smaller than the predetermined value T, the processing is skipped, thereby obtaining an effect of relaxing dynamic range reduction caused upon correction for a block in which disclination occurrence is not so noticeable.

As described above, in the second embodiment, when performing correction value expansion processing, the correction value expansion processing is skipped by referring to the feature amount counters. This makes it possible to prevent disclination occurrence while improving the dynamic range.

[Third Embodiment]

In the third embodiment, another modification of correction value expansion processing will be described. The arrangement and operation of a liquid crystal projector 100 according to the third embodiment are the same as in the first embodiment (FIGS. 1 to 12) except correction value expansion processing. Correction value expansion processing according to the third embodiment will be described below.

Figure 16:
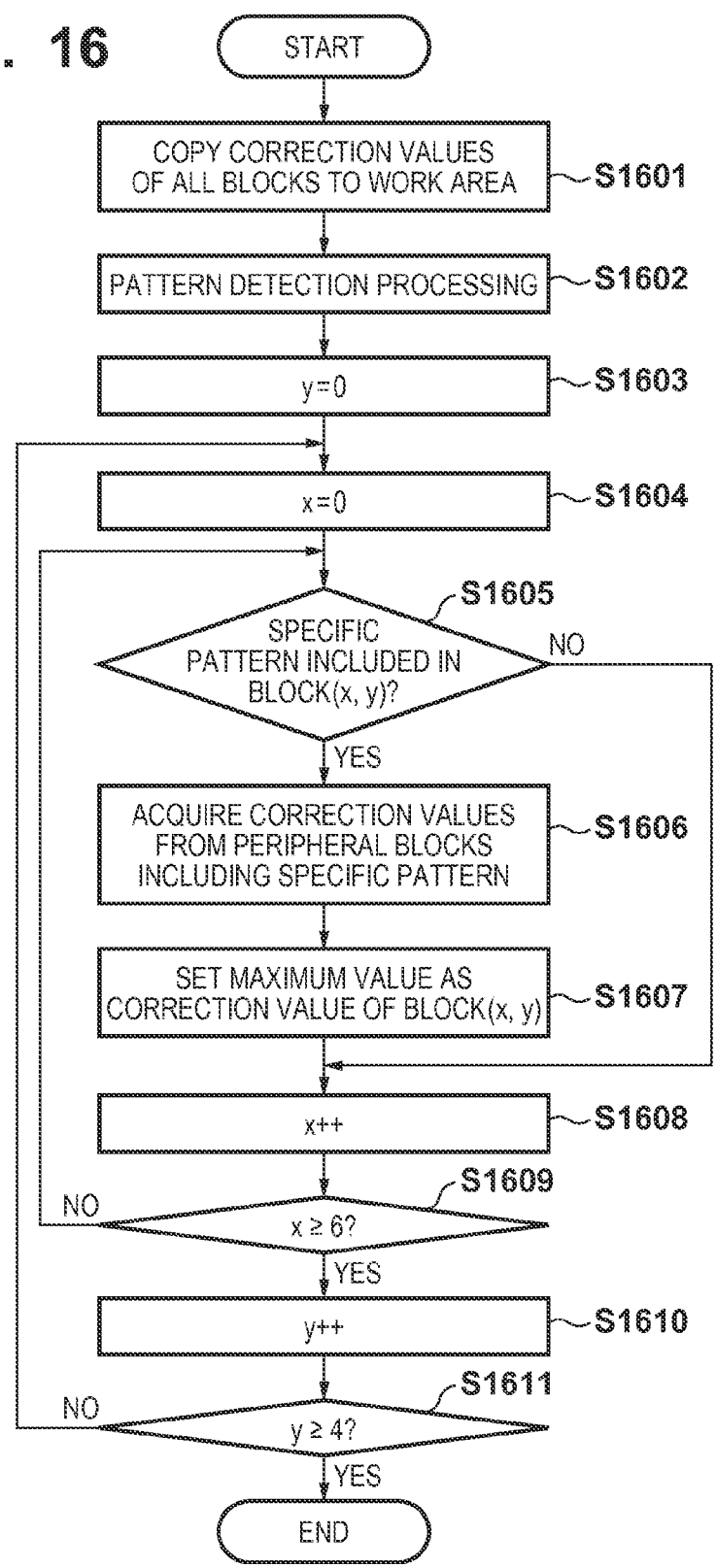
FIG. 16 is a flowchart showing correction value expansion processing according to the third embodiment.

FIG. 16 is a flowchart showing the procedure of correction value expansion processing according to the third embodiment. When correction value expansion processing starts, in step S1601, a CPU 110 temporarily copies the correction values of all blocks to the work area. In step S1602, the CPU 110 detects a specific pattern included in the image data. The specific pattern indicates a pattern in which disclination occurrence is easily visually recolonized. Examples are a face 1701, a character region 1702, and an edge 1703 shown in FIG. 17A. The specific pattern is detected by pattern matching or frequency analysis of the image. Note that in the third embodiment, specific pattern detection is done by the CPU 110. Instead, hardware dedicated to pattern detection may be provided, and coordinate information of a detected pattern may be received from the hardware.

After pattern detection, the CPU 110 initializes variables x and y to 0 (steps S1603 and S1604). In step S1605, the CPU 110 determines whether a block (x, y) includes the specific pattern. If the block does not include the specific pattern, the process advances to step S1608 while skipping correction value expansion processing. On the other hand, if the block includes the specific pattern, the process advances to step S1606, and the CPU 110 acquires the correction values of peripheral blocks including part of the specific pattern.

Peripheral blocks including a specific pattern will be described with reference to FIG. 17B. For example, assume that a block 1704 indicated by the thick line in FIG. 17B is being corrected. The block 1704 includes the face 1701 that is one of the specific patterns. In this case, the operation of acquiring correction values from peripheral blocks including part of the specific pattern indicates acquiring correction values from three blocks represented by the hatched portions including part of the face 1701.

After acquiring the correction values of the peripheral blocks including the specific pattern, in step S1607, the CPU 110 sets the maximum value out of the correction values of the local block (x, y) as the correction value of the block (x, y). From then on, the above-described processes of steps S1605 to S1607 are executed for all blocks by the processes of steps S1608 to S1611. Note than the processes of steps S1608 to S1611 are the same as the processes of steps S1308 to S1311 in FIG. 13A.

As described above, in the third embodiment, when performing correction value expansion processing, the intensity of correction is increased for a block than readily causes a disclination, thereby preventing or reducing disclination occurrence.

Note that in the above-described embodiments, the thresholds shown in FIG. 5B, the thresholds shown in FIGS. 12A and 12C, and the correction values shown in FIGS. 12B and 12D may be changeable by the user. Alternatively, a plurality of sets of thresholds or correction values may be prepared in advance, and the user may select a desired set.

[Other Embodiments]

Embodiments of the present invention can also be realized by a computer of a system or apparatus that reads out and executes computer executable instructions recorded on a storage medium (for example, non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-174362, filed Aug. 6, 2012, which is hereby incorporated by reference herein in its entirety.

What is claimed is:

1. A display apparatus comprising:
a dividing unit that divides an image into blocks including a first block, a second block, a third block, and a fourth block, each of the blocks including pixels;
a control unit that
(a) calculates first lower correction data based on how many pixels matched to a first disclination pattern are in the first block and how many pixels matched to a second disclination pattern are in the first block,
(b) calculates first upper correction data based on how many pixels matched to a third disclination pattern are in the first block and how many pixels matched to a fourth disclination pattern are in the first block,
(c) calculates second lower correction data based on how many pixels matched to the first disclination pattern are in the second block and how many pixels matched to the second disclination pattern are in the second block,
(d) calculates second upper correction data based on how many pixels matched to the third disclination pattern are in the second block and how many pixels matched to the fourth disclination pattern are in the second block,
(e) calculates third lower correction data based on how many pixels matched to the first disclination pattern are in the third block and how many pixels matched to the second disclination pattern are in the third block,
(f) calculates third upper correction data based on how many pixels matched to the third disclination pattern are in the third block and how many pixels matched to the fourth disclination pattern are in the third block,
(g) calculates fourth lower correction data based on how many pixels matched to the first disclination pattern are in the fourth block and how many pixels matched to the second disclination pattern are in the fourth block, and
(h) calculates fourth upper correction data based on how many pixels matched to the third disclination pattern are in the fourth block and how many pixels matched to the fourth disclination pattern are in the fourth block;
a first generating unit that generates interpolated upper correction data corresponding to a target pixel based on the first upper correction data, the second upper correction data, the third upper correction data, and the fourth upper correction data;
a second generating unit that generates interpolated lower correction data corresponding to the target pixel based on the first lower correction data, the second lower correction data, the third lower correction data, and the fourth lower correction data; and
a changing unit that changes a dynamic range of the target pixel based on the interpolated upper correction data and the interpolated lower correction data.

2. The display apparatus according to claim 1, wherein the first block is adjacent to at least one of the second block, the third block, and the fourth block.

3. The display apparatus according to claim 1, wherein the control unit changes the first upper correction data based on the first upper correction data, the second upper correction data, the third upper correction data, and the fourth upper correction data if the first upper correction data is adjacent to the second upper correction data, the third upper correction data, and the fourth upper correction data.

4. The display apparatus according to claim 1, wherein the control unit changes the first lower correction data based on the first lower correction data, the second lower correction data, the third lower correction data, and the fourth lower correction data if the first upper correction data is adjacent to the second upper correction data, the third upper correction data, and the fourth upper correction data.

5. The display apparatus according to claim 1, wherein the control unit (a) determines whether the image includes a predetermined pattern, and (b) changes the first upper correction data based on the first upper correction data, the second upper correction data, the third upper correction data, and the fourth upper correction data if the first block includes the predetermined pattern, and the first upper correction data is adjacent to the second upper correction data, the third upper correction data, and the fourth upper correction data.

6. The display apparatus according to claim 1, wherein the control unit (a) determines whether the image includes a predetermined pattern, and (b) changes the first lower correction data based on the first lower correction data, the second lower correction data, the third lower correction data, and the fourth lower correction data if the first block includes the predetermined pattern, and the first upper correction data is adjacent to the second upper correction data, the third upper correction data, and the fourth upper correction data.

7. The display apparatus according to claim 1, wherein at least one of the dividing unit, the control unit, the first generating unit, the second generating unit, and the changing unit has a hardware structure.

8. The display apparatus according to claim 1, further comprising:
   a light source;
   a separating unit that separates light received from the light source into different lights corresponding to different colors;
   liquid crystal elements that pass through the different lights;
   a combining unit that combines lights received from the liquid crystal elements; and
   a projection unit that projects light received from the combining unit.

9. The display apparatus according to claim 1, further comprising
   light sources corresponding to different colors;
   liquid crystal elements that pass through different lights received from the light sources;
   a combining unit that combines lights received from the liquid crystal elements; and
   a projection unit that projects light received from the combining unit.

10. The display apparatus according to claim 1, wherein the display apparatus includes a projector.

11. The display apparatus according to claim 1, wherein the display apparatus includes a liquid crystal display apparatus.

12. The display apparatus according to claim 1, further comprising:
    an image capture unit that captures an image; and
    a memory that stores image data corresponding to the captured image.

13. A method comprising:
    dividing an image into blocks including a first block, a second block, a third block, and a fourth block, each of the blocks including pixels;
    calculating first lower correction data based on how many pixels matched to a first disclination pattern are in the first block and how many pixels matched to a second disclination pattern are in the first block;
    calculating first upper correction data based on how many pixels matched to a third disclination pattern are in the first block and how many pixels matched to a fourth disclination pattern are in the first block;
    calculating second lower correction data based on how many pixels matched to the first disclination pattern are in the second block and how many pixels matched to the second disclination pattern are in the second block;
    calculating second upper correction data based on how many pixels matched to the third disclination pattern are in the second block and how many pixels matched to the fourth disclination pattern are in the second block;
    calculating third lower correction data based on how many pixels matched to the first disclination pattern are in the third block and how many pixels matched to the second disclination pattern are in the third block;
    calculating third upper correction data based on how many pixels matched to the third disclination pattern are in the third block and how many pixels matched to the fourth disclination pattern are in the third block;
    calculating fourth lower correction data based on how many pixels matched to the first disclination pattern are in the fourth block and how many pixels matched to the second disclination pattern are in the fourth block;
    calculating fourth upper correction data based on how many pixels matched to the third disclination pattern are in the fourth block and how many pixels matched to the fourth disclination pattern are in the fourth block;
    generating interpolated upper correction data corresponding to a target pixel based on the first upper correction data, the second upper correction data, the third upper correction data, and the fourth upper correction data;
    generating interpolated lower correction data corresponding to the target pixel based on the first lower correction data, the second lower correction data, the third lower correction data, and the fourth lower correction data; and
    changing a dynamic range of the target pixel based on the interpolated upper correction data and the interpolated lower correction data.

14. The method according to claim 13, wherein the first block is adjacent to at least one of the second block, the third block, and the fourth block.

15. The method according to claim 13, further comprising changing the first upper correction data based on the first upper correction data, the second upper correction data, the third upper correction data, and the fourth upper correction data if the first upper correction data is adjacent to the second upper correction data, the third upper correction data, and the fourth upper correction data.

16. The method according to claim 13, further comprising changing the first lower correction data based on the first lower correction data, the second lower correction data, the third lower correction data, and the fourth lower correction data if the first upper correction data is adjacent to the second upper correction data, the third upper correction data, and the fourth upper correction data.

17. The method according to claim 13, further comprising:
    determining whether the image includes a predetermined pattern; and
    changing the first upper correction data based on the first upper correction data, the second upper correction data, the third upper correction data, and the fourth upper correction data if the first block includes the predetermined pattern, and the first upper correction data is adjacent to the second upper correction data, the third upper correction data, and the fourth upper correction data.

18. The method according to claim 13, further comprising:
    determining whether the image includes a predetermined pattern; and
    changing the first lower correction data based on the first lower correction data, the second lower correction data, the third lower correction data, and the fourth lower correction data if the first block includes the predetermined pattern, and the first upper correction data is adjacent to the second upper correction data, the third upper correction data, and the fourth upper correction data.

19. A non-transitory storage medium that stores a program for causing a computer to execute a method, the method comprising:
    dividing an image into blocks including a first block, a second block, a third block, and a fourth block, each of the blocks including pixels;
    calculating first lower correction data based on how many pixels matched to a first disclination pattern are in the first block and how many pixels matched to a second disclination pattern are in the first block;
    calculating first upper correction data based on how many pixels matched to a third disclination pattern are in the first block and how many pixels matched to a fourth disclination pattern are in the first block;
    calculating second lower correction data based on how many pixels matched to the first disclination pattern are in the second block and how many pixels matched to the second disclination pattern are in the second block;

calculating second upper correction data based on how many pixels matched to the third disclination pattern are in the second block and how many pixels matched to the fourth disclination pattern are in the second block;

calculating third lower correction data based on how many pixels matched to the first disclination pattern are in the third block and how many pixels matched to the second disclination pattern are in the third block;

calculating third upper correction data based on how many pixels matched to the third disclination pattern are in the third block and how many pixels matched to the fourth disclination pattern are in the third block;

calculating fourth lower correction data based on how many pixels matched to the first disclination pattern are in the fourth block and how many pixels matched to the second disclination pattern are in the fourth block;

calculating fourth upper correction data based on how many pixels matched to the third disclination pattern are in the fourth block and how many pixels matched to the fourth disclination pattern are in the fourth block;

generating interpolated upper correction data corresponding to a target pixel based on the first upper correction data, the second upper correction data, the third upper correction data, and the fourth upper correction data;

generating interpolated lower correction data corresponding to the target pixel based on the first lower correction data, the second lower correction data, the third lower correction data, and the fourth lower correction data; and changing a dynamic range of the target pixel based on the interpolated upper correction data and the interpolated lower correction data.

\* \* \* \* \*